US011529729B2

United States Patent
Ogura

(10) Patent No.: US 11,529,729 B2
(45) Date of Patent: Dec. 20, 2022

(54) POWER TOOL

(71) Applicant: MAKITA CORPORATION, Anjo (JP)

(72) Inventor: Yasushi Ogura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 370 days.

(21) Appl. No.: 16/845,268

(22) Filed: Apr. 10, 2020

(65) Prior Publication Data

US 2021/0039242 A1 Feb. 11, 2021

(30) Foreign Application Priority Data

Aug. 8, 2019 (JP) .............................. JP2019-146644

(51) Int. Cl.
| | |
|---|---|
| H02K 5/24 | (2006.01) |
| B25F 5/00 | (2006.01) |
| H02K 11/33 | (2016.01) |
| B23D 49/16 | (2006.01) |
| H02K 5/20 | (2006.01) |
| H02K 7/075 | (2006.01) |
| H02K 7/14 | (2006.01) |
| H02K 9/06 | (2006.01) |
| H02K 11/00 | (2016.01) |

(Continued)

(52) U.S. Cl.
CPC ............ B25F 5/008 (2013.01); B23D 49/162 (2013.01); H02K 5/20 (2013.01); H02K 5/24 (2013.01); H02K 7/075 (2013.01); H02K 7/145 (2013.01); H02K 9/06 (2013.01); H02K 11/0094 (2013.01); H02K 11/33 (2016.01); H02K 21/16 (2013.01); B23D 51/10 (2013.01); B25F 3/00 (2013.01); B25F 5/006 (2013.01)

(58) Field of Classification Search
CPC ............ B25F 5/008; B25F 5/00; B25F 5/006; B23D 49/162; B23D 51/10; B23D 49/10; H02K 5/20; H02K 7/075; H02K 7/145; H02K 9/06; H02K 11/0094; H02K 11/33; H02K 21/16; H02K 5/24
See application file for complete search history.

(56) References Cited

U.S. PATENT DOCUMENTS

2010/0218385 A1* 9/2010 Mang ...................... B25F 5/008
30/298

FOREIGN PATENT DOCUMENTS

| JP | 2018-001339 A | 1/2018 |
| JP | 2018126864 A * | 8/2018 |

* cited by examiner

Primary Examiner — Bryan R Perez
(74) Attorney, Agent, or Firm — Oliff PLC

(57) ABSTRACT

A power tool includes a body housing including a first grip, inlet facing a front surface of the first grip, first outlet, and second outlet; a brushless motor held on the body housing and including a rotational shaft; an output unit supported on the body housing in a reciprocable manner; a power transmission mechanism between the brushless motor and the output unit in the body housing to transmit rotational motion of the rotational shaft to the output unit; a controller held on the body housing to control the brushless motor; and a fan held on the body housing and mounted on the rotational shaft. The body housing allows air drawn through the inlet and having cooled the brushless motor to be divided into first and second outlet blows respectively cooling the power transmission mechanism and discharged through the first outlet, and cooling the controller and discharged through the second outlet.

19 Claims, 13 Drawing Sheets

(51) Int. Cl.
*H02K 21/16* (2006.01)
*B23D 51/10* (2006.01)
*B25F 3/00* (2006.01)

POWER TOOL

CROSS-REFERENCE TO RELATED APPLICATIONS

This application claims the benefit of priority to Japanese Patent Application No. 2019-146644, filed on Aug. 8, 2019, the entire contents of which are hereby incorporated by reference.

BACKGROUND

1. Technical Field

The present invention relates to a power tool such as a rechargeable reciprocating saw.

2. Description of the Background

A known saber saw described in Japanese Unexamined Patent Application Publication No. 2018-1339 (Patent Literature 1) uses a brushless motor.

The saber saw includes a motor housing accommodating the brushless motor. The motor housing includes a cylindrical portion extending in the front-rear direction and a first extension extending downward from a lower rear end of the cylindrical portion toward the rear. The cylindrical portion accommodates the brushless motor. The first extension accommodates a controller for controlling the brushless motor.

The motor housing has an inlet in the rear of the cylindrical portion. The motor housing has an outlet in the front of the cylindrical portion.

The brushless motor includes a rotational shaft extending in the front-rear direction, and a fan fixed on the rotational shaft. The fan rotates coaxially with the rotational shaft.

BRIEF SUMMARY

In the above saber saw, an air blow generated by the rotating fan enters the cylindrical portion through the inlet in the rear of the cylindrical portion of the motor housing and is discharged out of the cylindrical portion through the outlet in the front. The air blow passes by the brushless motor but does not pass by the controller. The above saber saw is thus to be improved to cool the controller.

One or more aspects of the present invention are directed to a power tool that sufficiently cools a controller for a brushless motor.

An aspect of the present invention provides a power tool, including:
a body housing including
 a first grip,
 an inlet facing a front surface of the first grip,
 a first outlet, and
 a second outlet;
a brushless motor held on the body housing and including a rotational shaft;
an output unit supported on the body housing in a reciprocable manner;
a power transmission mechanism located between the brushless motor and the output unit in the body housing to transmit rotational motion of the rotational shaft to the output unit;
a controller held on the body housing to control the brushless motor; and
a fan held on the body housing and mounted on the rotational shaft,
wherein the body housing is configured to divide air drawn through the inlet and having cooled the brushless motor into a first outlet blow for cooling the power transmission mechanism and being discharged through the first outlet and a second outlet blow for cooling the controller and being discharged through the second outlet.

The power tool according to the above aspect of the present invention sufficiently cools the controller for the brushless motor.

DETAILED DESCRIPTION

Embodiments and modifications of the present invention will now be described with reference to the drawings as appropriate.

A reciprocating cutting tool according to embodiments of the present invention is an example of a power tool or a reciprocating tool, and more specifically, a reciprocating saw.

The directional terms such as front, rear, up, down, right, and left in the embodiments and the modifications are defined for ease of explanation, and may be changed depending on, for example, at least the operating situations or the status of a movable member.

The present invention is not limited to the embodiments and the modifications.

Figure 1:
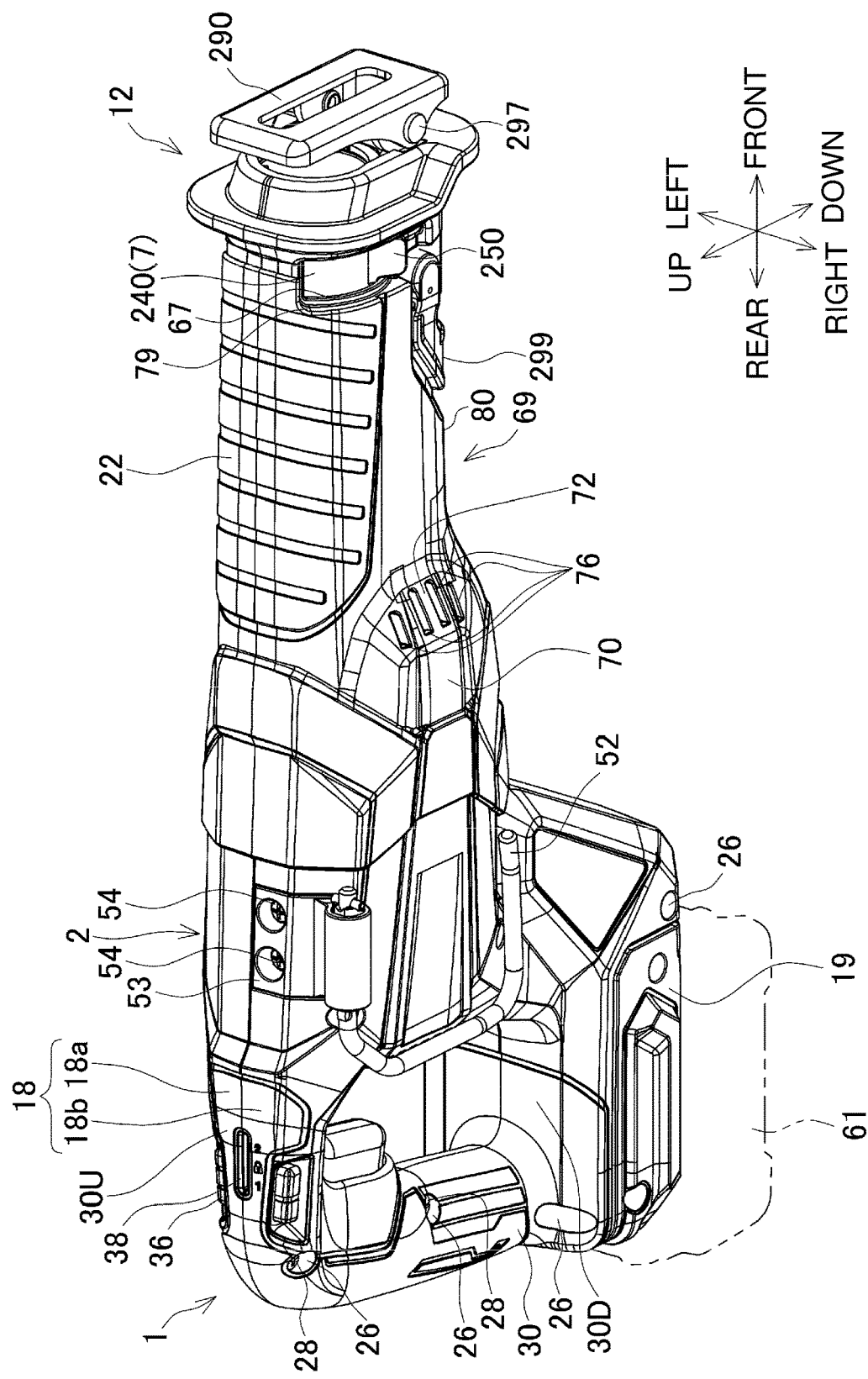
FIG. 1 is a perspective view of a reciprocating saw according to an embodiment of the present invention as viewed from above.
Figure 2:
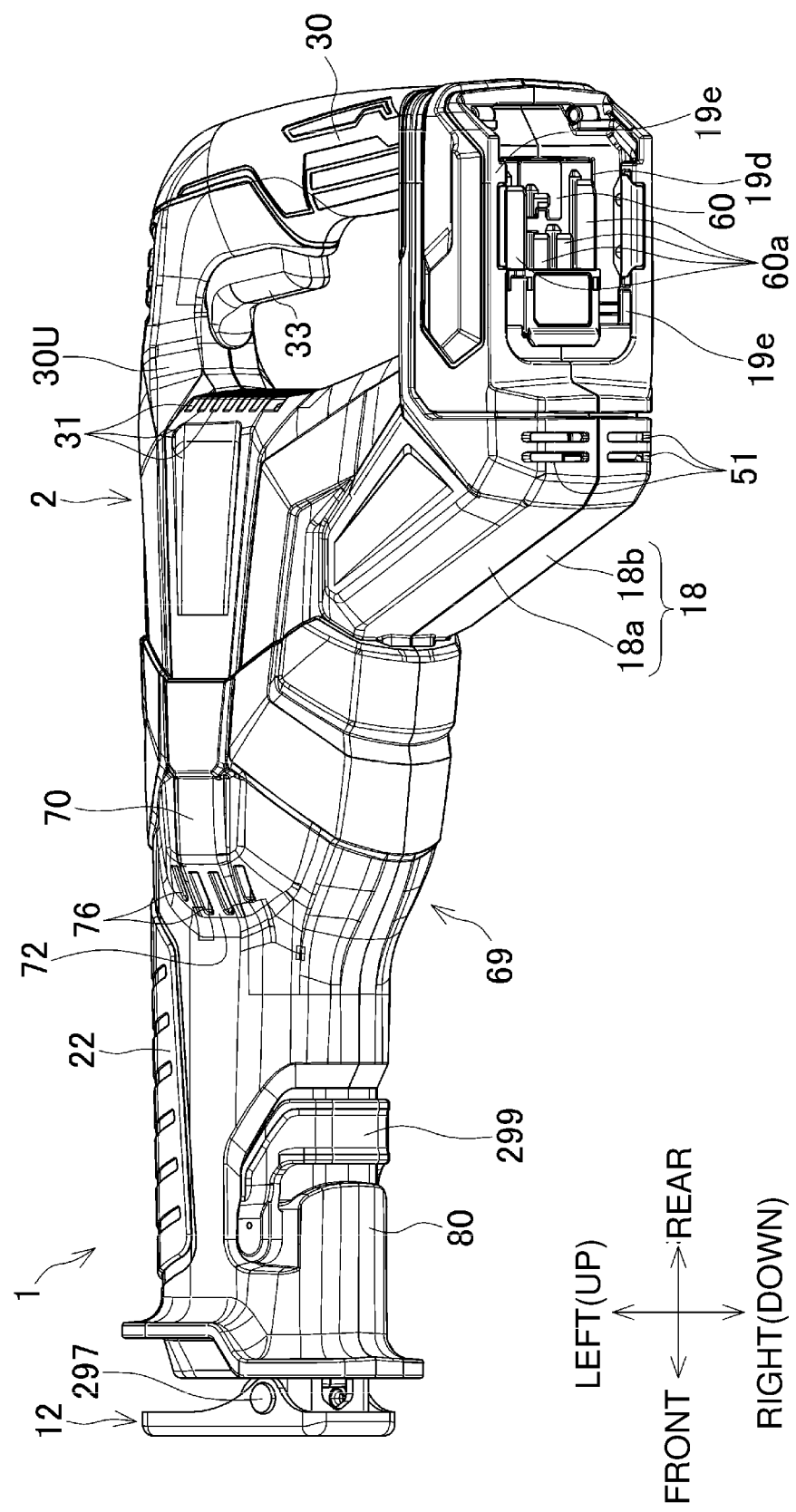
FIG. 2 is a perspective view of the reciprocating saw as viewed from below.
Figure 3:
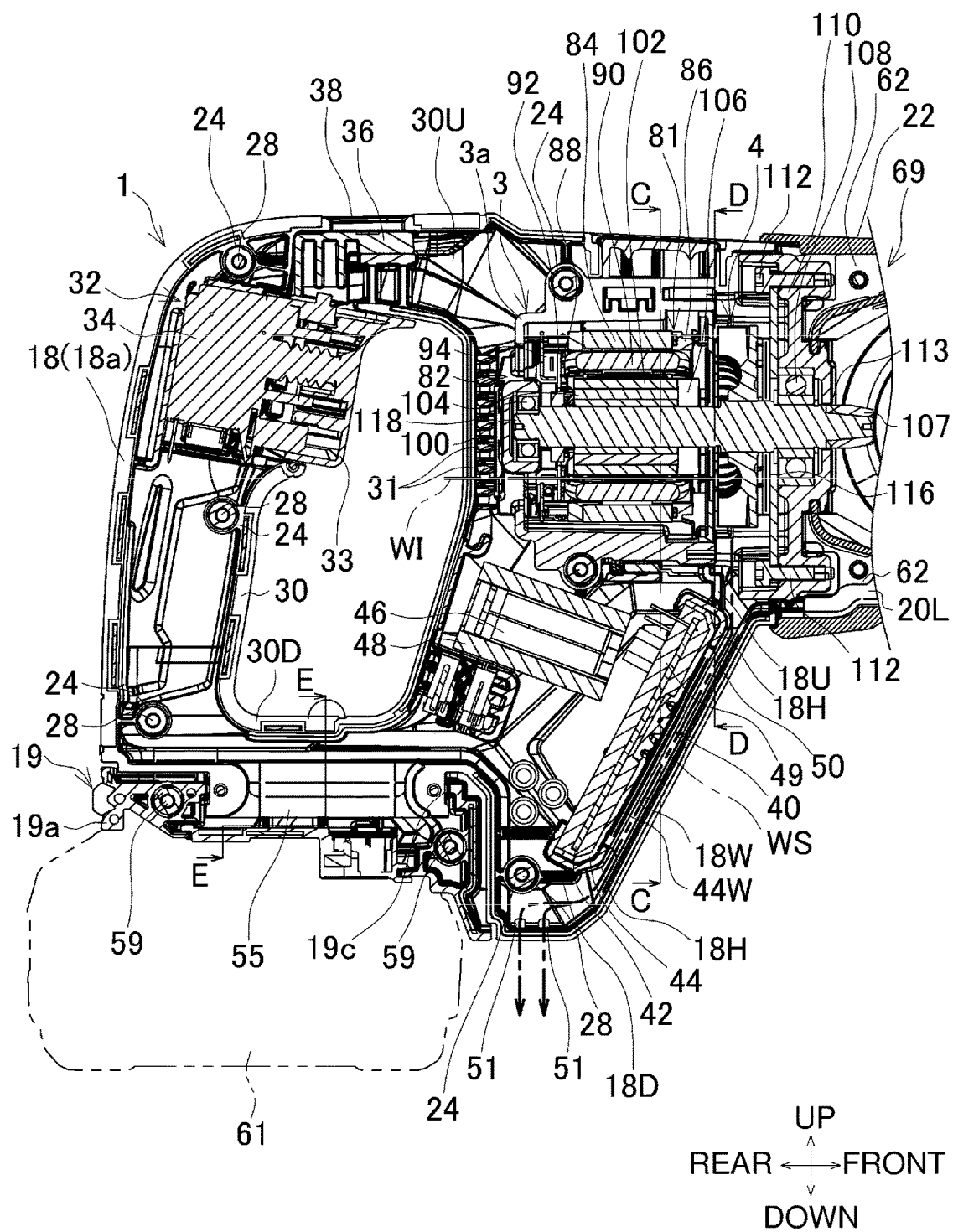
FIG. 3 is a longitudinal central sectional view of the reciprocating saw at the rear.
Figure 4:
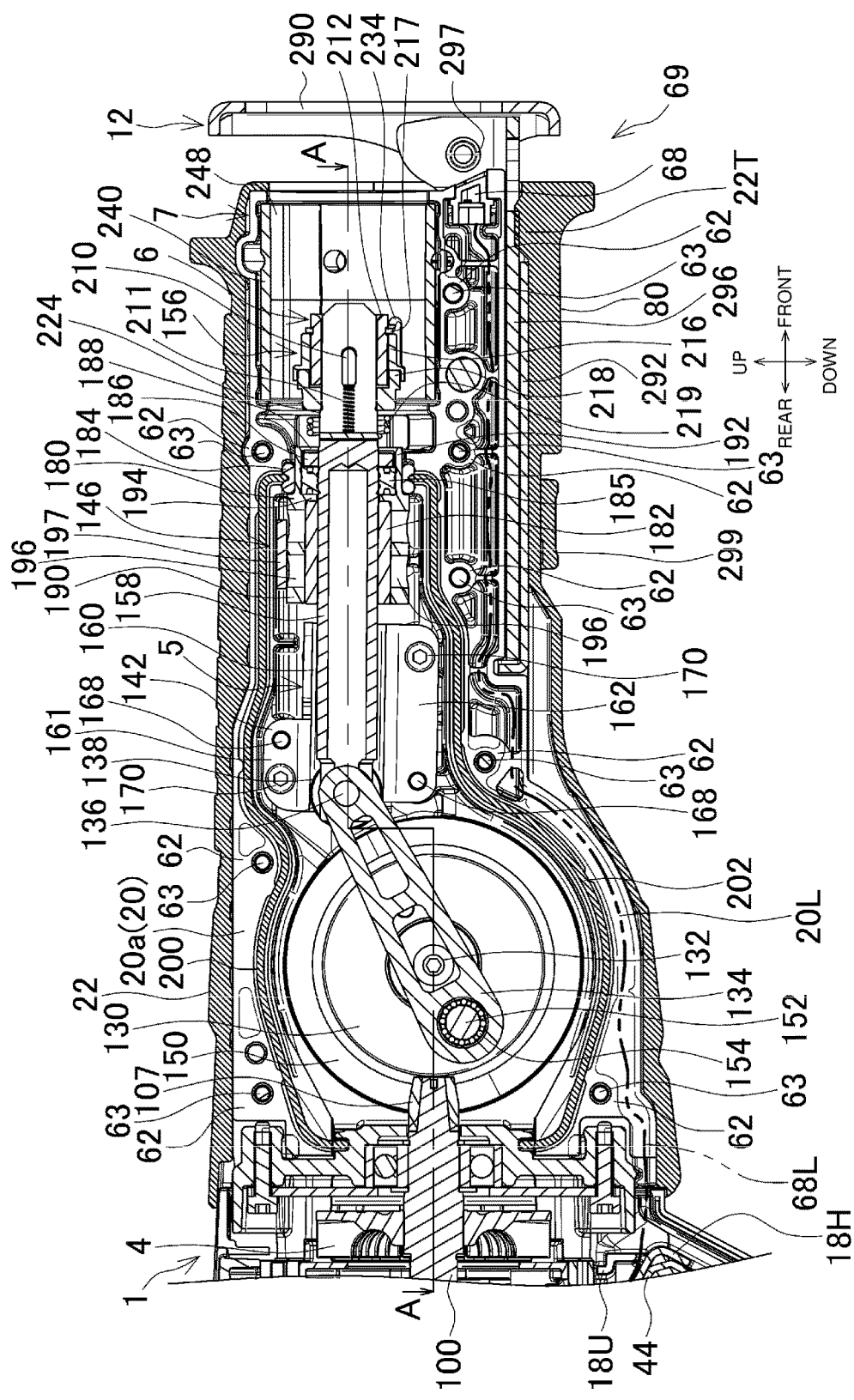
FIG. 4 is a longitudinal central sectional view of the reciprocating saw at the front.
Figure 5:
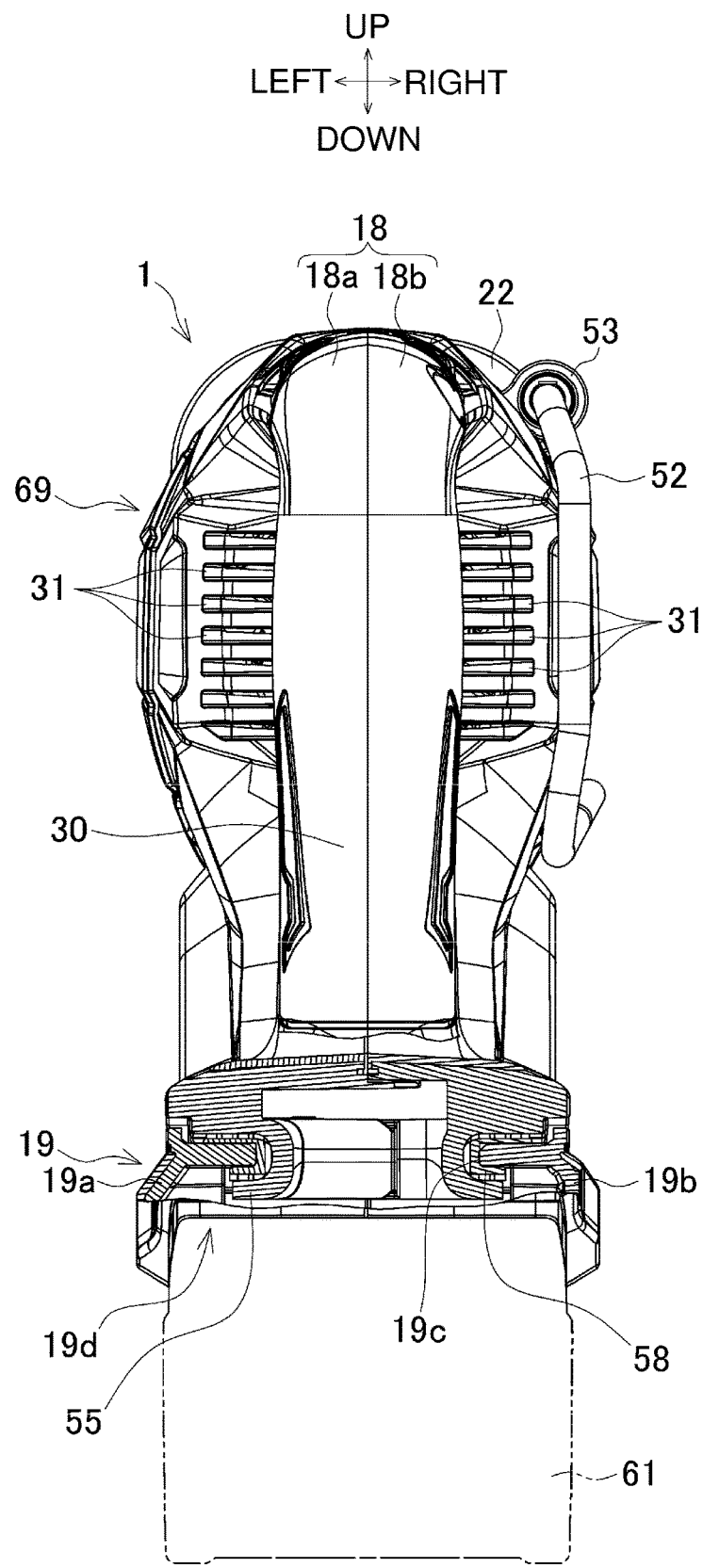
FIG. 5 is a cross-sectional view taken along line E-E in FIG. 3.
Figure 6:
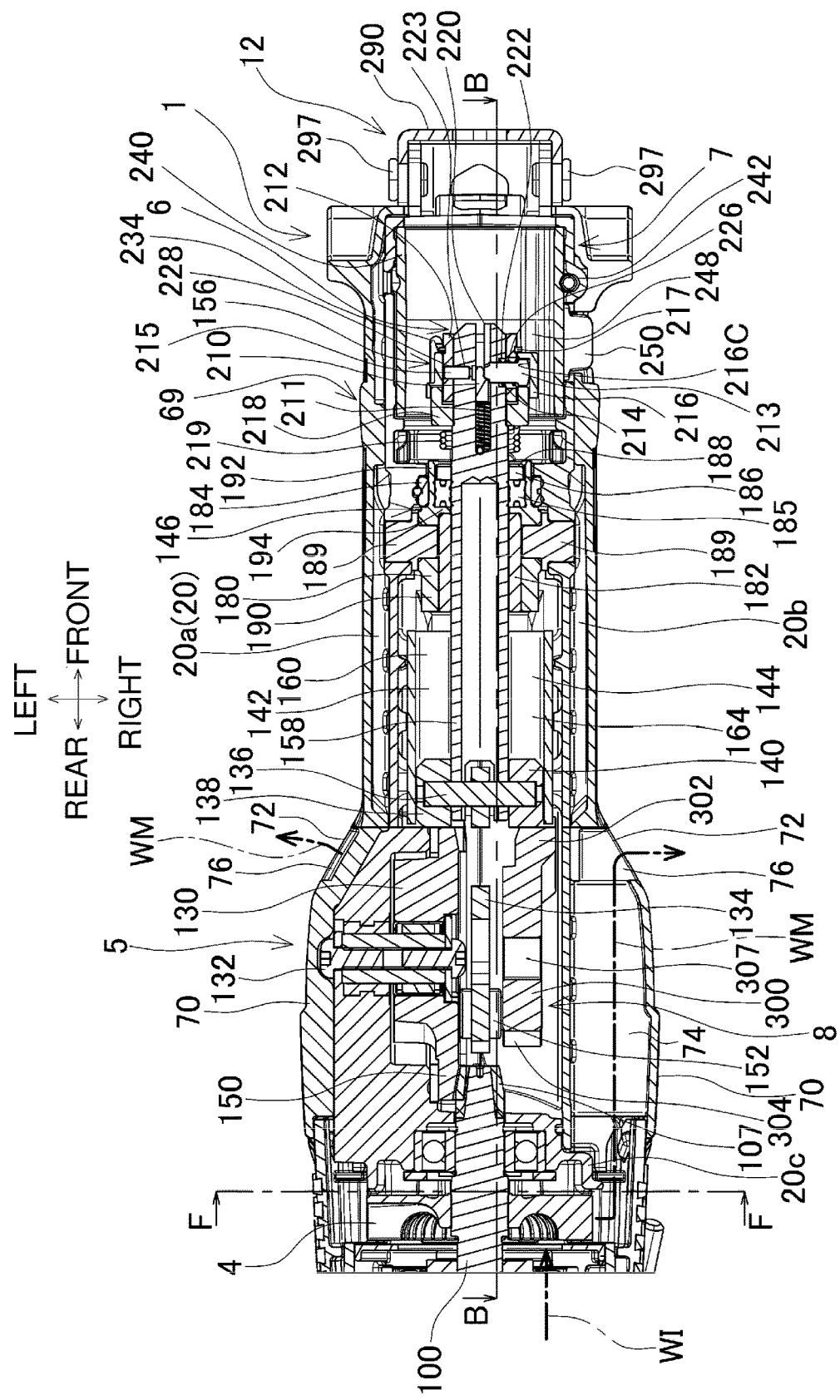
FIG. 6 is a cross-sectional view taken along line A-A in FIG. 4.
Figure 7:
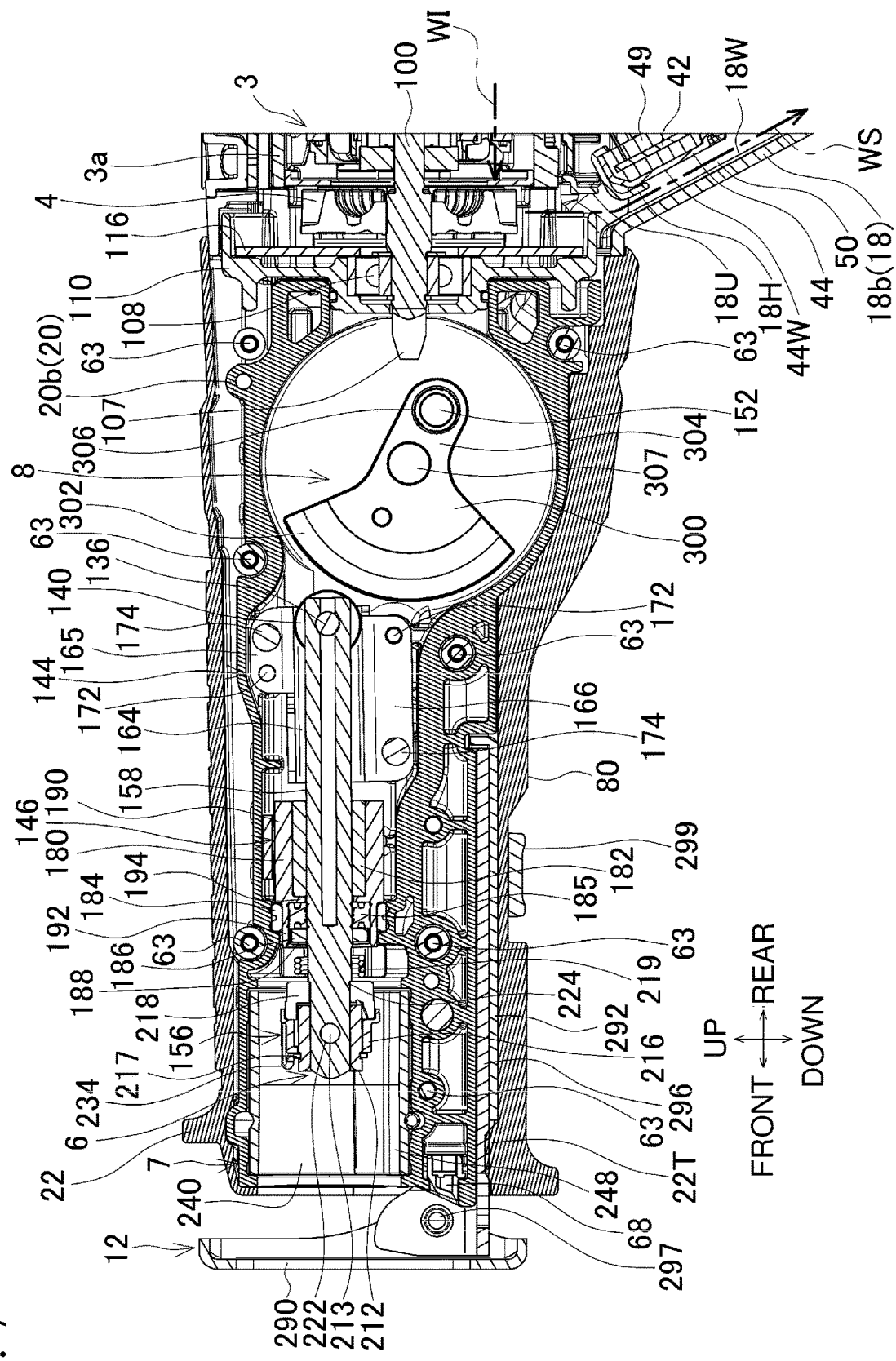
FIG. 7 is a cross-sectional view taken along line B-B in FIG. 6.

FIG. 1 is a perspective view of a reciprocating saw 1 according to an embodiment of the present invention as viewed from above. FIG. 2 is a perspective view of the reciprocating saw 1 as viewed from below. FIG. 3 is a longitudinal central sectional view of the reciprocating saw 1 at the rear. FIG. 4 is a longitudinal central sectional view of the reciprocating saw 1 at the front. FIG. 5 is a cross-sectional view taken along line E-E in FIG. 3. FIG. 6 is a cross-sectional view taken along line A-A in FIG. 4. FIG. 7 is a cross-sectional view taken along line B-B in FIG. 6. FIG.

Figure 9:
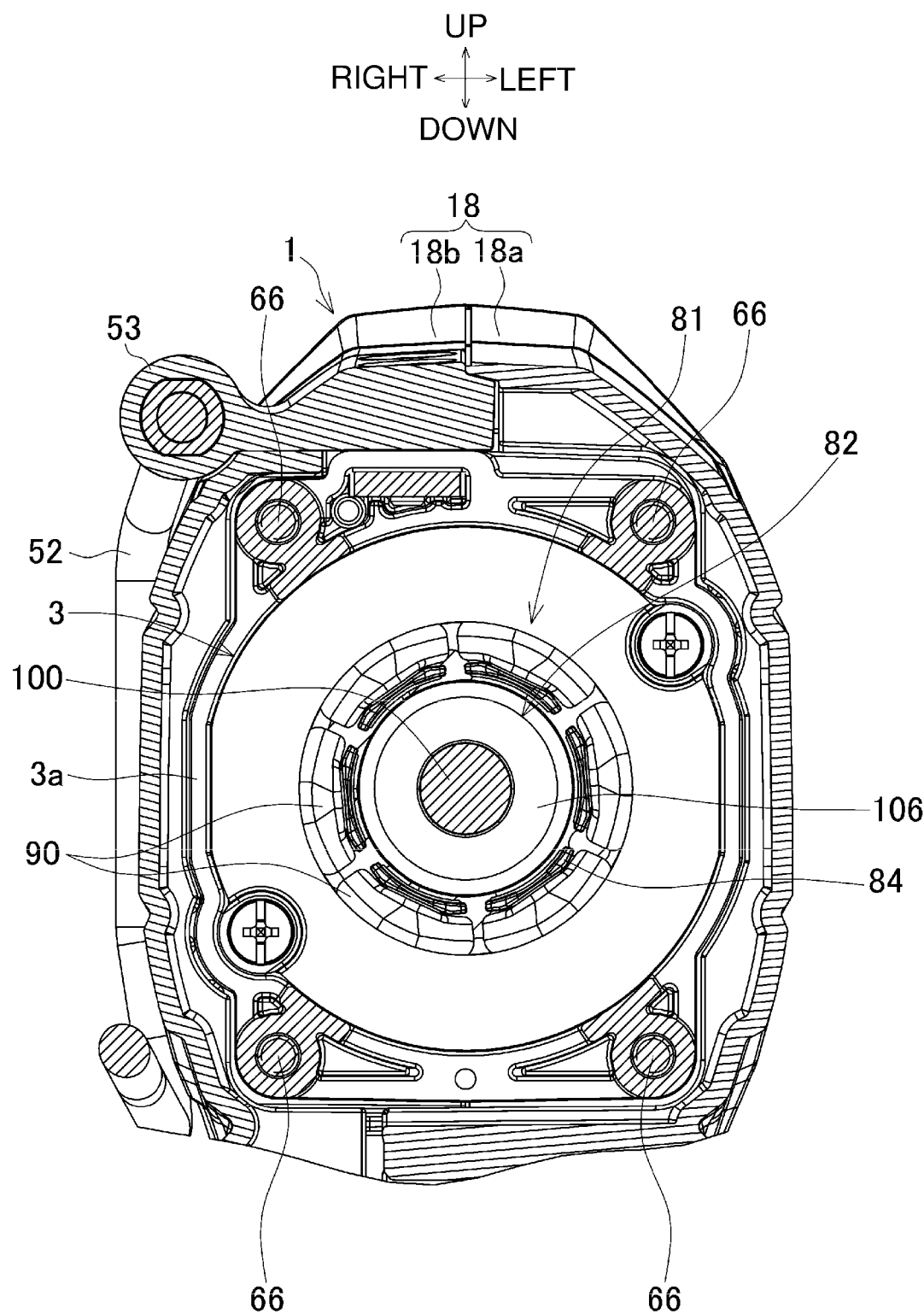
FIG. 9 is a cross-sectional view taken along line D-D in FIG. 3.

8 is a cross-sectional view taken along line C-C in FIG. 3. FIG. 9 is a cross-sectional view taken along line D-D in FIG. 3.

In FIGS. 3 and 4, the front part of the reciprocating saw 1 is located on the right, and the upper part of the reciprocating saw 1 is located on the top.

The reciprocating saw 1 includes a body housing 2, a motor 3, a fan 4, a reciprocating conversion mechanism 5, a slider (output unit) 6, a release mechanism 7, a counterweight mechanism 8, and a guide shoe 12.

The body housing 2 is a support frame for directly or indirectly holding the components.

The body housing 2 includes a motor housing 18, a battery mount housing 19, a gear housing 20, and a cover 22.

The motor housing 18 is cylindrical at its front. The motor housing 18 is looped at its rear. The motor housing 18 is formed from plastic. The motor housing 18 communicates with the gear housing 20.

The motor housing 18 holds the motor 3 in its upper front portion. The motor 3 includes a motor case 3a. The motor case 3a defines an outer wall of the motor 3.

The motor housing 18 is halved into a left motor housing 18a and a right motor housing 18b.

The left motor housing 18a has multiple screw bosses 24. The right motor housing 18b has multiple screw holes 26. The screw holes 26 are aligned with the screw bosses 24. Multiple screws 28 are placed through the corresponding screw bosses 24 and the screw holes 26, fastening the right motor housing 18b to the left motor housing 18a. The left motor housing 18a is a female member. The right motor housing 18b is a male member.

The looped rear extending vertically in the motor housing 18 defines a first grip 30. The first grip 30 is gripped by a user. The first grip 30 has an upper end connected to the upper front of the motor housing 18 with an upper joint 30U extending in the front-rear direction. The first grip 30 has a lower end connected to the lower front of the motor housing 18 with a lower joint 30D extending in the front-rear direction. The front of the motor housing 18, the upper joint 30U, the lower joint 30D, and the first grip 30 define the loop. The reciprocating saw 1 includes a D-shaped handle defined by the first grip 30, the upper joint 30U, and the lower joint 30D.

The motor housing 18 has multiple inlets 31 in a rear portion that faces the front surface of the looped first grip 30. Each inlet 31 extends laterally. The inlets 31 are aligned vertically. The motor 3 is located in front of the inlets 31.

The first grip 30 holds a main switch 32 in its upper portion.

The main switch 32 includes a trigger 33 and a main switch body 34.

The trigger 33 is exposed at the upper front of the first grip 30. The user can pull the trigger 33 with his or her finger. The trigger 33 is connected to the main switch body 34.

The main switch body 34 is located in the upper portion of the first grip 30. The main switch body 34 is turned on or off in response to the operation of the trigger 33. The main switch body 34 is turned on when the pulling amount of the trigger 33 reaches or exceeds a predetermined amount. The main switch body 34 transmits a signal (e.g., a resistance) that varies depending on the pulling amount reaching or exceeding the predetermined amount.

The trigger 33 turns on or off the motor 3 through the main switch body 34. The trigger 33 is a switching member for turning on or off the motor 3.

A speed switch button 36 is located above the trigger 33. The speed switch button 36 is a flat plate. The speed switch button 36 has its right and left portions exposed from the motor housing 18. The speed switch button 36 is slidable rightward when the left portion is pressed. The speed switch button 36 is slidable leftward when the right portion is pressed. The speed switch button 36 slid to the left switches the main switch body 34 to a low speed mode. The speed switch button 36 slid to the right switches the main switch body 34 to a high speed mode. The speed switch button 36 positioned in the middle prevents the trigger 33 from being pulled.

The motor housing 18 includes a speed indicator 38 on its upper surface and above the speed switch button 36. The speed indicator 38 indicates the speed in accordance with the position of the speed switch button 36. More specifically, the speed indicator 38 has an indication mark aligned with 1 when the speed switch button 36 is slid to the left. The speed indicator 38 has the indication mark aligned with a lock mark when the speed switch button 36 is in the middle. The speed indicator 38 has the indication mark aligned with 2 when the speed switch button 36 is slid to the right.

The motor housing 18 holds a controller 40 below the motor 3. The controller 40 includes a control circuit board 42 and a controller case 44.

The control circuit board 42 controls the motor 3. The control circuit board 42 includes a microcomputer and multiple (twelve) switching elements. The controller 40 may include the control circuit board 42 alone without the controller case 44.

The control circuit board 42 is connected to a capacitor 46 with multiple lead wires (not shown). The capacitor 46 includes a solid cylindrical capacitor body and a pair of terminal plates. The terminal plates extend in the same direction as the central axis of the capacitor body. The capacitor 46 is located in a capacitor cover 48. The capacitor cover 48 is cylindrical and formed from a sponge. The capacitor cover 48 is held on the motor housing 18.

The capacitor 46 and the capacitor cover 48 extend in the front-rear direction. The terminal plates of the capacitor 46 thus extend in the front-rear direction. The reciprocating saw 1 mainly vibrates in the front-rear direction. The capacitor 46 is thus less likely to be damaged under vibrations over a long period of time.

The controller case 44 is a plastic box without a lid. The controller case 44 accommodates the control circuit board 42. The control circuit board 42 is covered with a mold layer 49 of a material injected in the controller case 44.

The controller 40 is located below the motor 3. The controller 40 is located obliquely, or more specifically, inclined upward toward the front. The control circuit board 42 has its rear surface exposed inside the motor housing 18. The capacitor 46 and the capacitor cover 48 are located behind the controller 40.

The controller case 44 has its front surface along the front wall of a lower front portion of the motor housing 18. Board case holding ribs 18H are located above and below the controller case 44. Each board case holding rib 18H stands on the inner surface of the motor housing 18. Each board case holding rib 18H is U-shaped in a side view. The motor housing 18 holds the controller 40 with the board case holding ribs 18H.

A first air channel rib 18U is located on the upper end of the upper board case holding rib 18H and above the front surface of the controller case 44. The first air channel rib 18U extends vertically. The first air channel rib 18U stands on the inner surface of the motor housing 18. The first air channel rib 18U is integral with the upper board case holding rib 18H. The first air channel rib 18U has its upper end adjacent to the lower front of the motor case 3a.

A second air channel rib 18D is located on the lower end of the lower board case holding rib 18H and below the front surface of the controller case 44. The second air channel rib 18D extends laterally. The second air channel rib 18D extends along the lower surface of the lower front portion of the motor housing 18. The second air channel rib 18D is integral with a single screw boss 24. The second air channel rib 18D stands on the inner surface of the motor housing 18. The second air channel rib 18D is integral with the lower board case holding rib 18H. The second air channel rib 18D has its upper end connected to the rear surface of the lower front portion of the motor housing 18.

A lower air channel (outlet channel) 50 is defined between the front surface of the first air channel rib 18U, the front surface of the upper board case holding rib 18H, the front surface of the controller case 44, the front surface of the lower board case holding rib 18H, the lower surface of the second air channel rib 18D, and the rear surface of the front wall and the upper surface of the lower wall of the lower front portion of the motor housing 18. The front surface of the controller case 44 defines a first wall surface 44W. The rear surface of the lower front portion of the motor housing 18 defines a second wall surface 18W.

The motor housing 18 has multiple lower outlets 51 in a lower wall of the lower front portion, which is a front portion of the lower joint 30D. Each lower outlet 51 extends laterally. The multiple lower outlets 51 are aligned laterally and in the front-rear direction. The lower outlets 51 are second outlets.

The lower outlets 51 are located in a lower portion of the motor housing 18 that is lower than a portion holding the controller 40. More specifically, the lower outlets 51 are opposite to the fan 4 from the controller 40 in the motor housing 18.

A hook 52 is attached with a hook attachment 53 on the outer surface (upper right portion) of the motor housing 18. The hook 52 is U-shaped in a side view. The hook 52 is formed by bending a wire.

The hook 52 is rotatable about the hook attachment 53. The hook attachment 53 is fastened to the motor housing 18 with multiple (two) screws 54 received in the motor housing 18. Each screw 54 extends vertically.

The motor housing 18 has its lower rear portion (rear portion of the lower joint 30D) stepped upward from the lower front portion (front portion of the lower joint 30D) of the motor housing 18. The motor housing 18 includes a protruding portion 55 protruding downward from the lower surface of the lower rear portion. The protruding portion 55 has a flange extending radially outward at its lower end. The protruding portion 55 excluding the flange is cylindrical and extends vertically (protruding body).

The battery mount housing 19 is halved into a left battery mount housing 19a and a right battery mount housing 19b. The battery mount housing 19 is formed from plastic.

The battery mount housing 19 is mounted on the protruding portion 55 of the motor housing 18 via a rubber buffer 58.

The rubber buffer 58 is an elastic rubber ring member. The rubber buffer 58 has a U-shaped cross section. The rubber buffer 58 is in contact with the protruding portion 55.

The battery mount housing 19 has, in its upper surface, an upper opening 19c with the size corresponding to the protruding body of the protruding portion 55. The upper opening 19c receives the protruding portion 55 and the rubber buffer 58. The rubber buffer 58 supports the rim of the upper opening 19c.

The left battery mount housing 19a and the right battery mount housing 19b are joined together with multiple screws 59 extending laterally.

The battery mount housing 19 has a lower opening 19d in its lower surface.

The battery mount housing 19 holds a terminal mount 60. The terminal mount 60 includes a box-like front portion and a plate-like rear portion. The terminal mount 60 closes the lower opening 19d and is exposed through the lower opening 19d. The terminal mount 60 holds multiple terminal plates 60a. Each terminal plate 60a extends in the front-rear direction at the rear of the terminal mount 60 and protrudes downward from the rear of the terminal mount 60.

Battery mount rails 19e serving as battery mounts are located on the right and left of the lower opening 19d. Each battery mount rail 19e extends in the front-rear direction.

The battery mount rails 19e receive a battery 61 that is slid forward from the rear. The mounted battery 61 is electrically connected to the terminal plates 60a. The battery 61 powers the motor 3.

The rubber buffer 58 reduces vibrations propagating from the motor housing 18 to the battery mount housing 19. This prevents misalignment between the mounted battery 61 and the terminal mount 60.

The lower outlets 51 in the motor housing 18 are adjacent to and in front of the battery mount rails 19e.

The gear housing 20 supports the components of the reciprocating conversion mechanism 5, the slider 6, and the counterweight mechanism 8 directly or indirectly. The gear housing 20 is formed from a metal. The gear housing 20 is connected to the front of the motor housing 18.

The gear housing 20 is halved, and is a cylinder having openings in its front and rear ends.

The gear housing 20 includes a left gear housing 20a and a right gear housing 20b.

The left gear housing 20a has multiple screw bosses 62. The right gear housing 20b has multiple screw holes corresponding to the screw bosses 62. One of the screws 63 is placed through the screw hole and received in the corresponding screw boss 62, fastening the right gear housing 20b to the left gear housing 20a. The left gear housing 20a receives its counterpart, and the right gear housing 20b is mounted over its counterpart.

Figure 8:
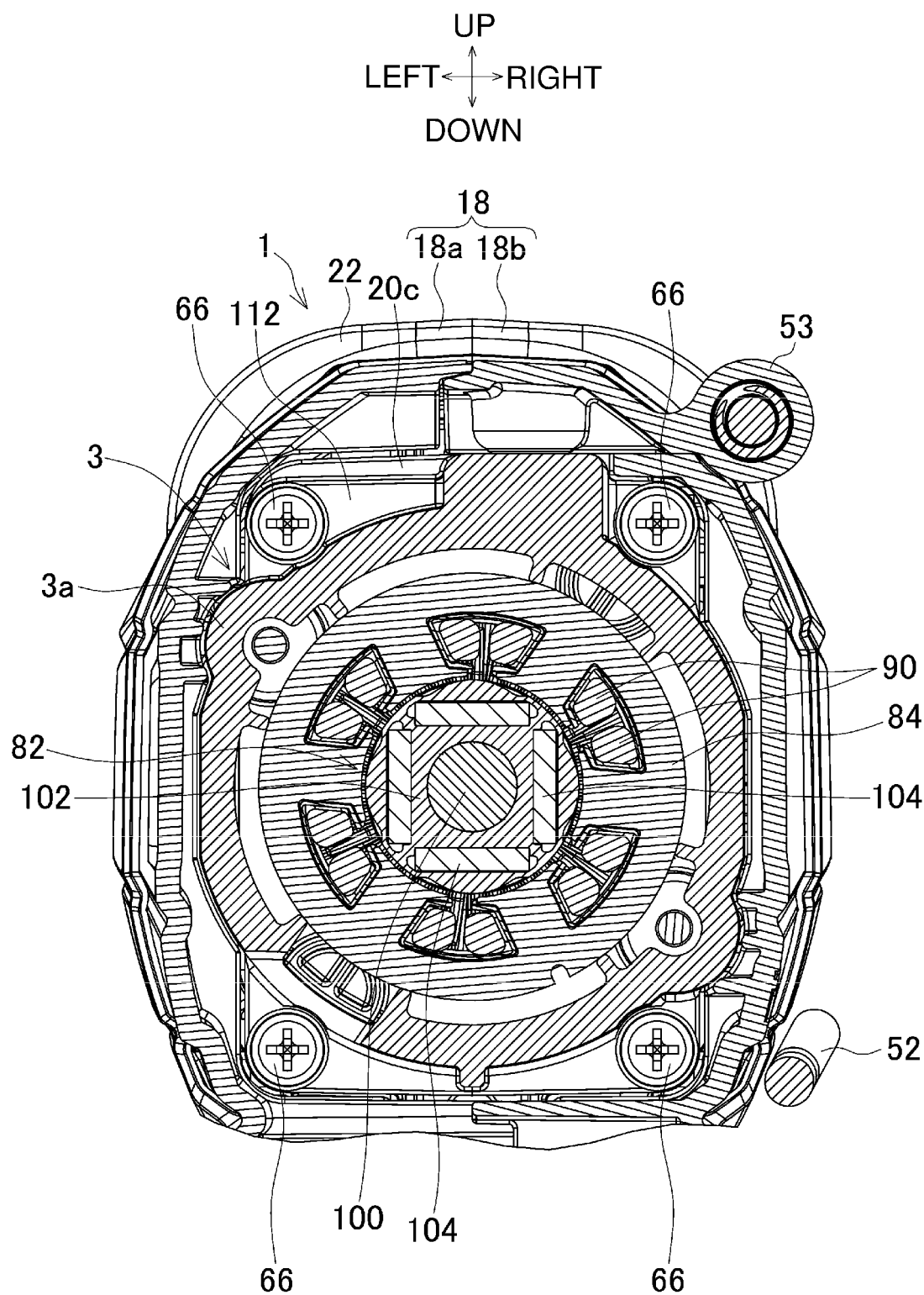
FIG. 8 is a cross-sectional view taken along line C-C in FIG. 3.

The rear end of the left gear housing 20a serves as a gear housing base 20c. The gear housing base 20c is connected to the motor housing 18. The gear housing base 20c is a plate extending vertically and laterally. The gear housing base 20c protrudes rightward from another part (inner surface) of the left gear housing 20a. The left gear housing 20a is attached to the front end of the motor housing 18 with multiple (upper left, lower left, upper right, and lower right) screws 66 (FIG. 8) extending frontward from the motor housing 18 into the gear housing base 20c.

The right gear housing 20b has a first operation tab hole 67 in its right front end. The first operation tab hole 67 is elongated vertically and has a width in the front-rear direction.

The gear housing 20 includes a lamp 68 at its lower front end. The lamp 68 is a light-emitting diode (LED) board. The LED board receives LEDs. The lamp 68 is held between the left gear housing 20a and the right gear housing 20b. The lamp 68 emits light forward. The lamp 68 can illuminate the front of the slider 6.

The motor 3, the main switch body 34, the terminal plates 60a, and the lamp 68 are each electrically connected to the control circuit board 42 with multiple lead wires (not shown).

The left gear housing 20a includes, in its lower thick portion, a path 20L extending from the front end with the lamp 68 to the rear end. The path 20L recedes leftward. The path 20L can receive the multiple lead wires. The gear housing 20 holding the release mechanism 7 on its front end is radially larger than a structure with no release mechanism 7. The larger gear housing 20 defines the path 20L in the resultant unused space in its lower portion.

As indicated collectively with a two-dot chain line 68L in FIG. 4, two lead wires for the lamp 68 pass through the path 20L. The lamp lead wires are efficiently located in the unused space in the gear housing 20.

A portion of the motor housing 18 holding the motor 3 (a portion outside the motor 3), the gear housing 20, and the components held by these housings form a body 69 of the reciprocating saw 1.

Figure 10:
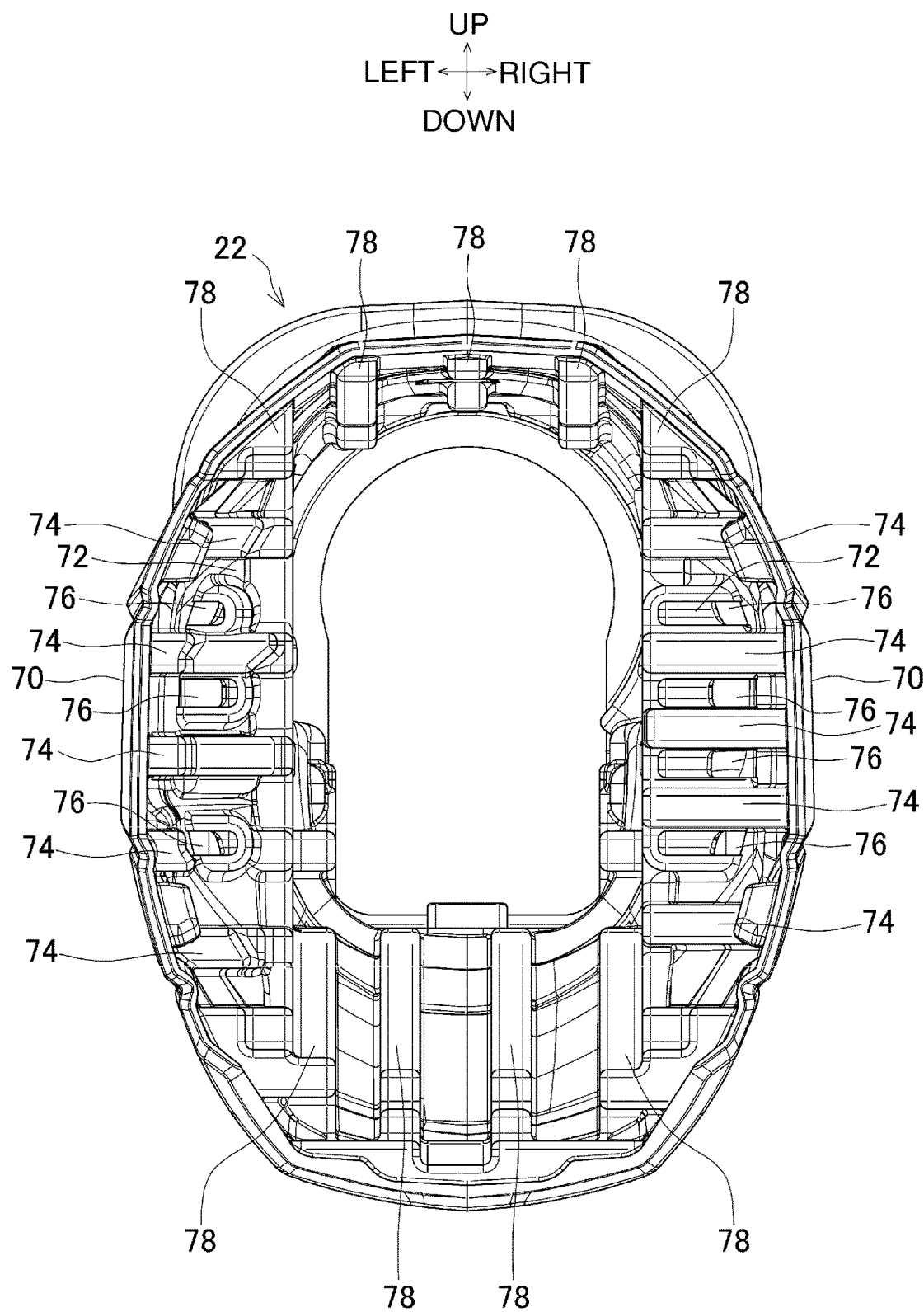
FIG. 10 is a rear view of a cover of the reciprocating saw.
Figure 11:
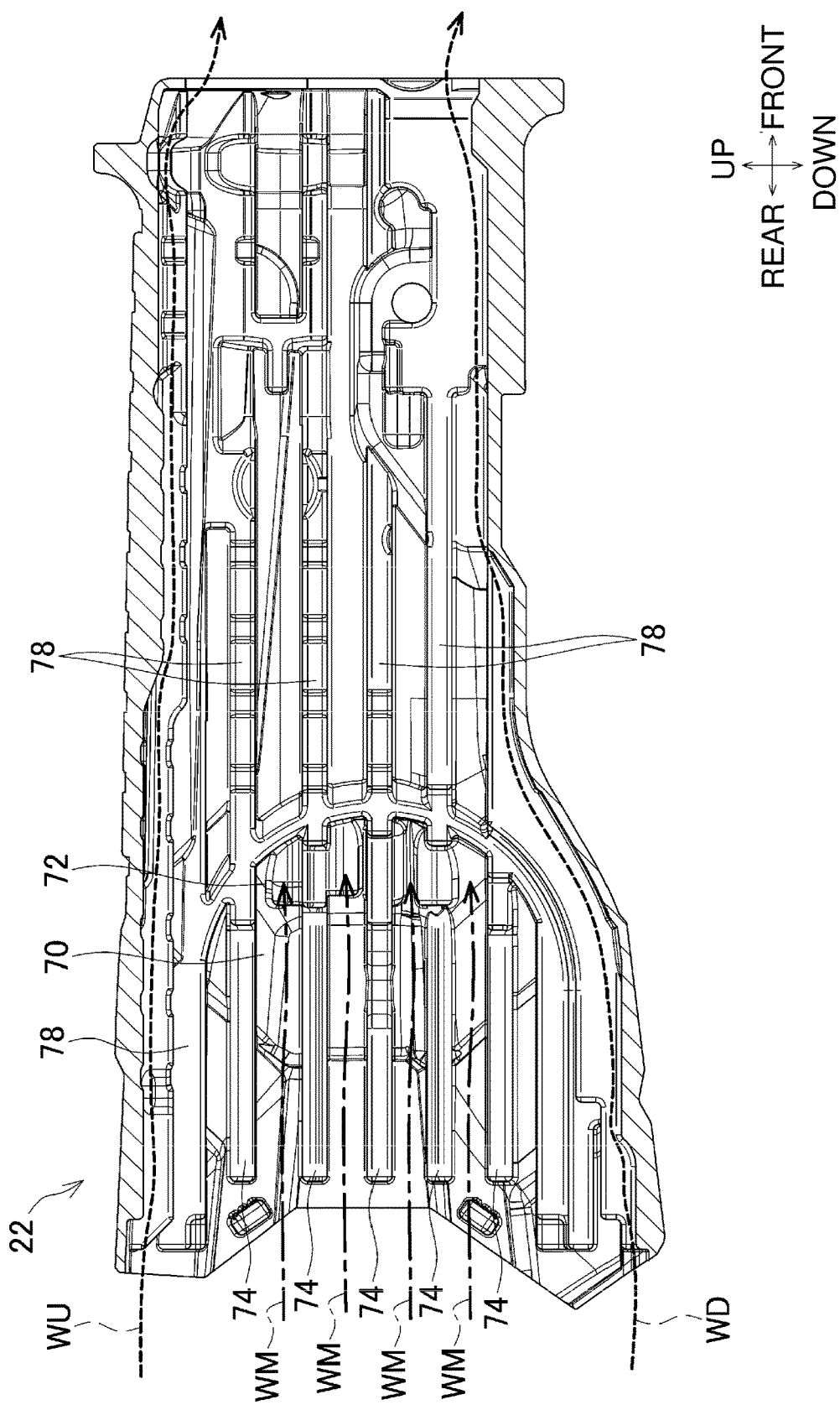
FIG. 11 is a longitudinal central sectional view of the cover in FIG. 10, showing its left half.
Figure 12:
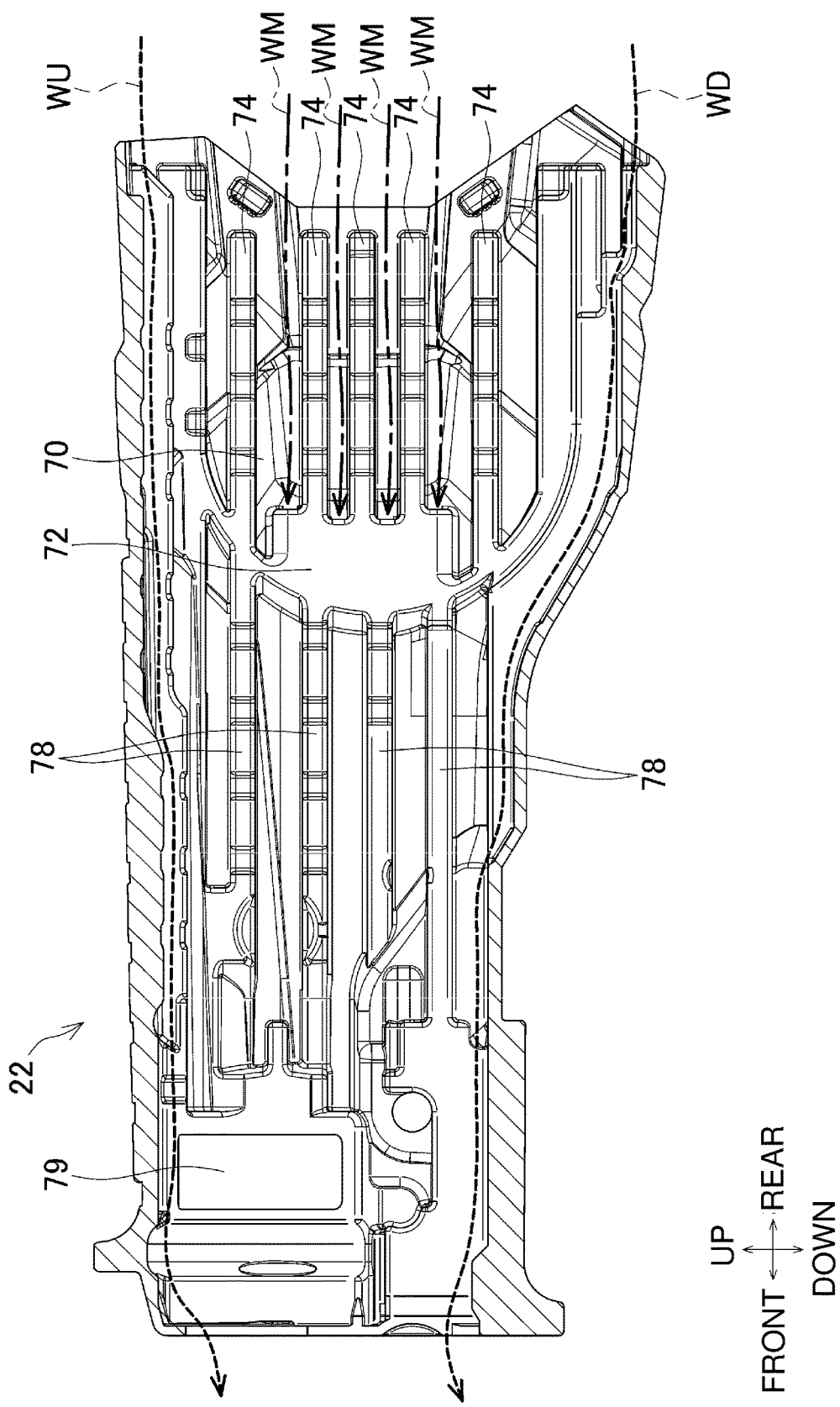
FIG. 12 is a longitudinal central sectional view of the cover in FIG. 10, showing its right half.

FIG. 10 is a rear view of the cover 22. FIG. 11 is a longitudinal central sectional view of the cover 22, showing its left half. FIG. 12 is a longitudinal central sectional view of the cover 22, showing its right half.

The cover 22 is cylindrical. The cover 22 is externally mounted on the gear housing 20. The cover 22 is formed from an elastic material (rubber) and located outside the gear housing 20 as an insulation cover. The cover 22 may not be a component of the body housing 2. The cover 22 may be formed from plastic.

The rear end of the cover 22 covers the front end of the motor housing 18. The cover 22 is continuous with the motor housing 18.

The cover 22 includes cover bulges 70 on its right and left rear portions. Each cover bulge 70 protrudes laterally outward relative to the front portion of the cover 22. Each cover bulge 70 has a U-shaped outer edge that widens rearward in a side view. Each cover bulge 70 has, at its front, a slope 72 that extends laterally outward toward the rear.

Each cover bulge 70 has multiple (five) cover bulge ribs 74 on its inner surface. Each cover bulge rib 74 protrudes laterally inward. Each cover bulge rib 74 is elongated in the front-rear direction. The front ends of the uppermost cover bulge rib 74 and the lowermost cover bulge rib 74 are connected to the corresponding slope 72.

The left slope 72 has multiple body outlets 76 between the uppermost cover bulge rib 74 and the lowermost cover bulge rib 74. The body outlets 76 are located alternately with the three middle cover bulge ribs 74 in the vertical direction. Similarly, the right slope 72 has multiple body outlets 76 between the uppermost cover bulge rib 74 and the lowermost cover bulge rib 74. The body outlets 76 are located alternately with the three middle cover bulge ribs 74 in the vertical direction. Each body outlet 76 is elongated in the front-rear direction. The multiple body outlets 76 are aligned vertically. The body outlets 76 in the right and left slopes 72 each extend obliquely with respect to the front-rear direction. The body outlets 76 are located in front of the fan 4. The body outlets 76 are first outlets.

The cover 22 has multiple cover ribs 78 on its inner surface. Each cover rib 78 protrudes radially inward. Each cover rib 78 is elongated in the front-rear direction.

The distal ends of the cover ribs 78 and the cover bulge ribs 74 are in contact with the outer surface of the gear housing 20. The rear ends of the cover bulge ribs 74 are in contact with the outer surface of the front end of the motor housing 18.

The cover 22 has a second operation tab hole 79 in its right front. The second operation tab hole 79 is elongated vertically and has a width in the front-rear direction. The second operation tab hole 79 is aligned with the first operation tab hole 67 in the gear housing 20.

A lower portion of the cover 22, or specifically, a lower front portion of the body housing 2, serves as a second grip 80. The second grip 80 is gripped by the user. The second grip 80 is located in front of the body outlets 76.

At least the number of sections in the body housing 2, the size of each section in the body housing 2, or the shape of each section in the body housing 2 may be modified variously. For example, the motor housing 18 may include, at its rear, a handle housing separate from the motor housing 18. The battery mount housing 19 may be integral with the motor housing 18.

The motor 3 is an electric motor. The motor 3 is a brushless motor. The motor 3 is driven with direct current (DC).

The motor 3 includes a motor case 3a, a stator 81, and a rotor 82.

The motor case 3a is held on the motor housing 18.

The stator 81 includes a stator core 84, a front insulator 86, a rear insulator 88, and multiple (six) coils 90. The stator 81 is cylindrical.

The stator core 84 is formed from a metal.

The stator core 84 includes a stator core base and multiple teeth. The stator core base is cylindrical. The stator core base has an axis extending in the front-rear direction. Each tooth protrudes radially inward from the inner surface of the stator core base. Each tooth is elongated in the front-rear direction.

The front insulator 86 is located in front of the stator core 84.

The rear insulator 88 is located behind the stator core 84.

Each coil 90 is wound around the corresponding tooth on the stator core 84 via the front insulator 86 and the rear insulator 88.

A sensor board 92 is fixed to the rear insulator 88. The sensor board 92 receives multiple (three) magnetic sensors on its rear surface. Each magnetic sensor receives a rotation detection signal indicating the rotational position of the rotor 82 to obtain the rotational state of the rotor 82. The sensor board 92 and the control circuit board 42 are electrically connected to each other with multiple (six) lead wires (signal lines), which are not shown. The signal lines pass through the lower front portion of the motor housing 18.

A coil connector 94 is located on a rear peripheral edge of the rear insulator 88. The coil connector 94 serves as a contact for electrically connecting the coils 90 in a predetermined manner. The coil connector 94 receives first ends of multiple (three) lead wires (power supply lines), which are not shown. The three power supply lines are used for three phases. Each power supply line passes through the lower front portion of the motor housing 18. Each power supply line has a second end connected to the control circuit board 42.

The rotor 82 is located inward from the stator 81 (inner rotor).

The rotor 82 includes a rotational shaft 100, a rotor core 102, multiple (four) permanent magnets 104, and a sleeve 106.

The rotational shaft 100 is a solid cylinder and extends in the front-rear direction. The rotational shaft 100 is formed from a metal. The rotational shaft 100 rotates about its own axis. The rotational shaft 100 has its front end extending into the rear end of the gear housing 20. The rotational shaft 100 receives a pinion gear 107 on its front end. The pinion gear 107 includes multiple teeth.

The rotor core 102 is cylindrical. The rotor core 102 has an axis extending in the front-rear direction. The rotor core 102 includes multiple steel plates stacked on one another in the front-rear direction. The rotor core 102 is fixed on the outer surface of the rotational shaft 100.

Each permanent magnet 104 is a plate. The four permanent magnets 104 are circumferentially aligned in the rotor core 102 to alternate in polarity. The four permanent magnets 104 are arranged collectively into a square prism. The four permanent magnets 104 are not in contact with one another.

The sleeve 106 is a metal (brass) ring member. The sleeve 106 is fixed to the front of the rotor core 102 and the front of the permanent magnets 104, and is fixed on the rotational shaft 100. The sleeve 106 fixed to the permanent magnets 104 can prevent the permanent magnets 104 from slipping off the rotational shaft 100.

A motor front bearing 108 is located in front of the sleeve 106. The motor front bearing 108 surrounds the front of the rotational shaft 100. The motor front bearing 108 supports the rotational shaft 100 in a manner rotatable about the axis.

The motor front bearing 108 is held on a bearing retainer 110. The bearing retainer 110 is a plate extending vertically and laterally. The bearing retainer 110 is located in the rear end of the gear housing 20. The bearing retainer 110 is attached to the rear end portion of the gear housing 20 with multiple screws 66. The bearing retainer 110 has a center hole 113. The hole 113 receives the front end of the rotational shaft 100.

The motor front bearing 108 is fixed with a plate 114. The plate 114 is flat. The plate 114 is located behind the motor front bearing 108. The plate 114 retains the motor front bearing 108 in the bearing retainer 110. The plate 114 is attached to the bearing retainer 110 with multiple screws 115. The plate 114 has a center hole 116. The hole 116 receives the rotational shaft 100.

A motor rear bearing 118 surrounds the rear end of the rotational shaft 100. The motor rear bearing 118 supports the rotational shaft 100 in a manner rotatable about the axis. The motor rear bearing 118 is held on the motor case 3a.

Figure 13:
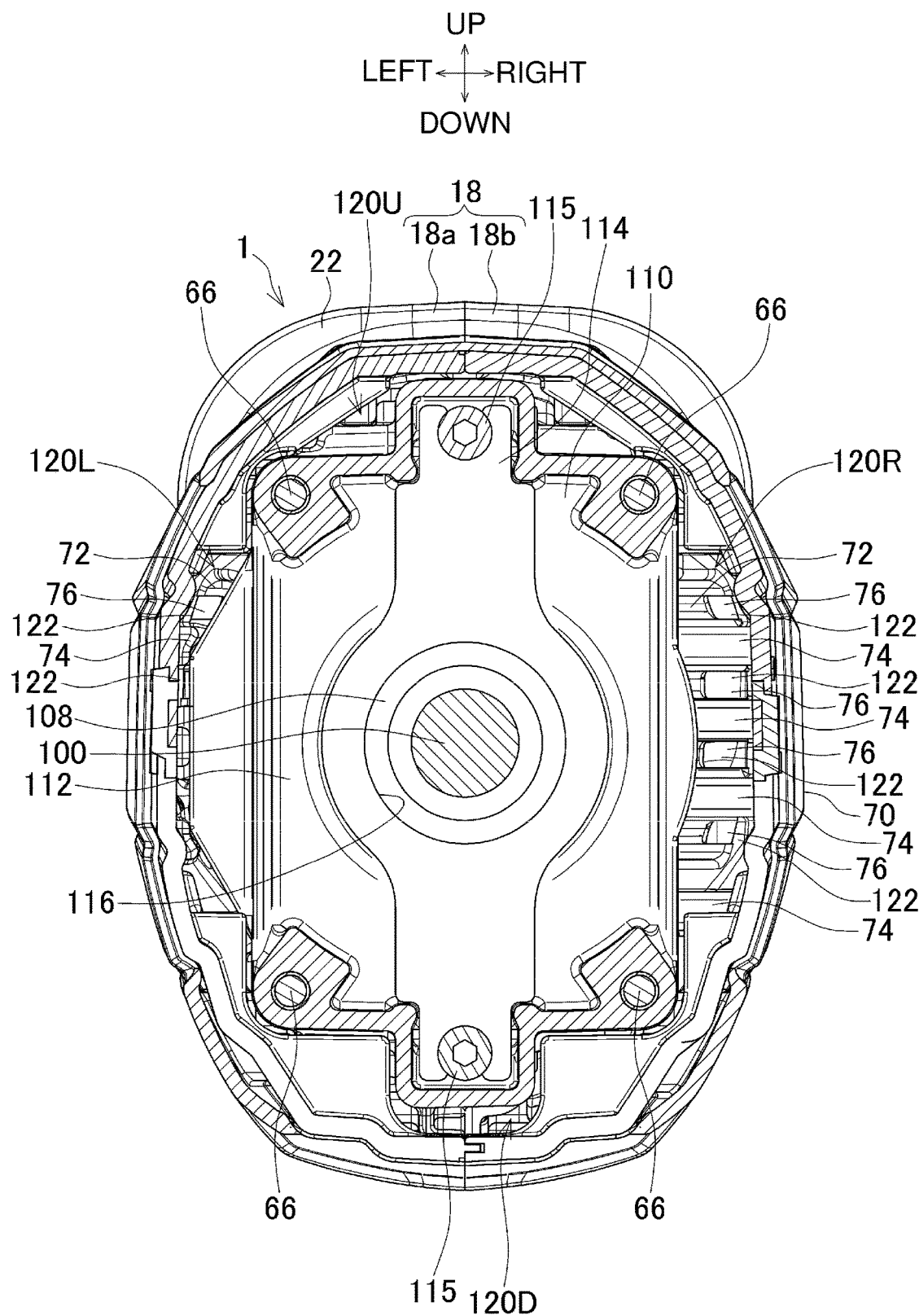
FIG. 13 is a cross-sectional view taken along line F-F in FIG. 6.

FIG. 13 is a cross-sectional view taken along line F-F in FIG. 6.

The bearing retainer 110 has clearances 120U, 120D, 120L, and 120R respectively at its upper, lower, left, and right positions. The clearances 120U, 120D, 120L, and 120R are defined between the bearing retainer 110 and the motor housing 18.

The upper clearance 120U has a larger surface area as viewed from the rear (in a rear view) than the lower clearance 120D in a rear view. The left clearance 120L has a larger surface area than the upper clearance 120U in a rear view. The right clearance 120R has a larger surface area than the left clearance 120L in a rear view.

The left cover bulge ribs 74 in the cover 22 are located in front of the clearance 120L. Multiple left body air channels 122 thus extend from the clearance 120L through the left cover bulge ribs 74 to the left body outlets 76.

The right cover bulge ribs 74 in the cover 22 are located in front of the clearance 120R. Multiple right body air channels 122 thus extend from the clearance 120R through the right cover bulge ribs 74 to the right body outlets 76.

The fan 4 is located around the front of the rotational shaft 100 and behind the motor front bearing 108. The fan 4 is a centrifugal fan with multiple blades. The fan 4 rotates and forces the air radially outward. The fan 4 is integrally fixed on the rotational shaft 100. The fan 4 is held on the motor housing 18 with the rotor 82 and the motor case 3a.

The bearing retainer 110 is located in front of the fan 4. The clearances 120U, 120D, 120L, and 120R are arranged in front of the fan 4 to surround the fan 4. The body air channels 122 extend from the clearances 120L and 120R.

The first air channel ribs 18U are located below the rear end of the fan 4. The upper end of the lower air channel 50 is located below the fan 4.

The fan 4 may be a component of the motor 3.

The reciprocating conversion mechanism 5 is a power transmission mechanism for transmitting power from the motor 3 to the slider 6. The reciprocating conversion mechanism 5 transmits rotational motion of the rotational shaft 100 of the motor 3 to the slider 6. The reciprocating conversion mechanism 5 is held on the gear housing 20. The reciprocating conversion mechanism 5 is located between the motor 3 and the slider 6.

The reciprocating conversion mechanism 5 includes a crank gear 130, a support shaft 132, a connecting rod 134, a pin 136, a left guide roller 138, a right guide roller 140, a left guide 142, a right guide 144, and a slider guide 146.

The crank gear 130 includes a bevel gear 150 and an eccentric shaft 152.

The crank gear 130 is a disk. The crank gear 130 extends in the front-rear and vertical directions. The crank gear 130 has a center hole. The bevel gear 150 includes multiple bevel teeth. The bevel gear 150 is located on the outer edge of the right surface of the crank gear 130. The bevel gear 150 meshes with the pinion gear 107. The crank gear 130 has a larger diameter (more teeth) than the pinion gear 107. The crank gear 130 thus reduces the rotation of the rotational shaft 100.

The eccentric shaft 152 protrudes rightward from a peripheral right surface portion of the crank gear 130 radially inward from the bevel gear 150. The eccentric shaft 152 is integral with the crank gear 130. The eccentric shaft 152 is a solid cylinder. The eccentric shaft 152 protrudes at a position decentered from the rotation center of the crank gear 130 (support shaft 132).

The support shaft 132 passes through the center hole of the crank gear 130. The support shaft 132 extends laterally. The crank gear 130 is rotatable about the support shaft 132.

The connecting rod 134 is like an arm. The connecting rod 134 extends in the front-rear direction. The connecting rod 134 has its rear end connected to the eccentric shaft 152 of the crank gear 130 with a bearing 154. The bearing 154 is a needle bearing.

The connecting rod 134 has its front end received in the rear end of the slider 6. The slider 6 is connected to the reciprocating conversion mechanism 5. The slider 6 is located in front of the reciprocating conversion mechanism 5. The slider 6 extends in the front-rear direction. The slider 6 is supported on the gear housing 20 in a reciprocable manner.

The slider 6 includes a blade clamp 156 and a slider base 158.

The blade clamp 156 is a tip tool clamp. The blade clamp 156 is located around the front end of the slider base 158.

The slider base 158 is a hollow cylinder with a bottom, and extends in the front-rear direction. The slider base 158 is circular and has no corners in a cross section (section extending vertically and laterally). The slider base 158 may have, in a cross section, an outer shape without corners, such as an oval, or an outer shape with corners, such as a rectangle and a polygon.

The blade clamp 156 is expanded vertically and laterally relative to the slider base 158. The blade clamp 156 receives a blade (not shown). The blade is a tip tool. The blade is an elongated plate and extends in the front-rear direction when attached. The blade has an edge on a longer side. The edge includes saw teeth. The blade is attached with its edge facing downward. The blade may be attached with its edge facing upward. The blade may have edges on the two longer sides. The tip tool may be any tool other than the blade.

The pin 136 is connected to the front end of the connecting rod 134. The pin 136 is a solid cylinder. The pin 136 extends laterally.

The pin 136 is placed through the front end of the connecting rod 134 in a relatively rotatable manner.

The pin 136 is placed through the rear end portion of the slider base 158. The pin 136 is placed in a lateral hole in the slider base 158, and is rotatable relative to the slider base 158. The pin 136 is prevented from slipping off the slider base 158, and is reciprocable together with the slider base 158.

The left guide roller 138 is located at the left end of the pin 136.

The right guide roller 140 is located at the right end of the pin 136.

The left guide roller 138 and the right guide roller 140 are formed from a sintered material.

The left guide roller 138 is supported on the left end of the pin 136 in a rotatable manner.

The right guide roller 140 is supported on the right end of the pin 136 in a rotatable manner.

The connecting rod 134, the left guide roller 138, and the right guide roller 140 are rotatable relative to the pin 136. The pin 136 connects the connecting rod 134 with the slider base 158. The pin 136 serves as a shaft for the left guide roller 138 and the right guide roller 140.

The slider base 158 is hollow and has an opening in its rear end. The opening in the rear end of the slider base 158 receives the front end of the connecting rod 134 and the middle portion of the pin 136 in the lateral direction. The two ends of the pin 136, the left guide roller 138, and the right guide roller 140 are located outside the opening in the rear end of the slider base 158.

The left guide 142 has a groove 160, an upper side portion 161, and a lower side portion 162.

The left guide 142 is located outside on the left of the left guide roller 138. The left guide 142 extends in the front-rear direction.

The groove 160 is in the middle of the left guide 142 in the vertical direction. The groove 160 recedes leftward and is open rightward. The groove 160 extends in the front-rear direction. The groove 160 has a vertical dimension (the width of the groove 160) similar to, or more specifically, slightly larger than the diameter of the left guide roller 138.

The upper side portion 161 extends upward from the upper side of the groove 160.

The lower side portion 162 extends downward from the lower side of the groove 160.

The right guide 144 is located outside on the right of the right guide roller 140. The right guide 144 is substantially symmetric to the left guide 142 with respect to a plane. Similarly to the left guide 142, the right guide 144 has a groove 164, an upper side portion 165, and a lower side portion 166.

The groove 164 recedes rightward and is open leftward.

The left guide 142 and the right guide 144 face each other. The lower side portions 162 and 166 of the left guide 142 and the right guide 144 are spaced from each other by substantially the same distance as the lateral dimension of the connecting rod 134.

The left guide 142 has boss holes in the front portion of the upper side portion 161 and the rear portion of the lower side portion 162. The boss holes receive the corresponding bosses 168 to position the left guide 142. The bosses 168 protrude inward from the inner surface of the left gear housing 20a. The left guide 142 has screw holes in the rear portion of the upper side portion 161 and the front portion of the lower side portion 162. The screw holes receive screws 170 placed until in contact with the left gear housing 20a to fasten the left guide 142 to the left gear housing 20a.

Similarly to the left guide 142, the right guide 144 is positioned by bosses 172. The right guide 144 is fastened with screws 174.

The slider guide 146 includes a slider guide case 180, an oilless bearing 182, an outer ring 184, an inner ring 185, an inner front ring 186, and a washer 188. The slider guide 146 supports the slider base 158 in a reciprocable manner.

The slider guide case 180 is cylindrical. The slider guide case 180 has an axis in the front-rear direction. The slider guide case 180 is a thermally treated cut material. The slider guide case 180 is fastened to the gear housing 20 with right and left pins 189. The pins 189 each extend laterally and are received in the right and left holes in the slider guide case 180.

The slider guide case 180 includes a case body 190, a sealing portion 192, and a rib 194. The case body 190 is cylindrical. The sealing portion 192 is cylindrical and protrudes frontward from the front end of the case body 190. The rib 194 protrudes radially inward from the front inner surface of the case body 190. The rib 194 is a ring member.

The oilless bearing 182 is cylindrical. The oilless bearing 182 is press-fitted into the case body 190. The oilless bearing 182 is formed from a sintered material, or specifically a porous material with numerous pores. The oilless bearing 182 allows at least part of a lubricant, such as lubricating oil in grease, to enter and pass through the pores (lubricant-passage member). Grease includes lubricating oil and a thickener. A sintered material has numerous pores for adsorbing lubricating oil contained in grease (lubricant). The sintered material thus allows the lubricating oil to pass through.

The slider guide case 180 formed from a cut material is harder than the oilless bearing 182 formed from a sintered material. More specifically, the slider guide case 180 has a higher hardness than the oilless bearing 182.

The inner diameter of the oilless bearing 182 is the same as the outer diameter of the slider base 158. The front surface of the oilless bearing 182 is in contact with the rear surface of the rib 194. The oilless bearing 182 may be fastened to the case body 190 by welding or with screws.

The case body 190 has, on its top and bottom, multiple (two at each position) grease reservoirs 196 (first lubricant reservoir) aligned in the front-rear direction. Each grease reservoir 196 is a vertical hole. Each grease reservoir 196 communicates with the outer surface of the oilless bearing 182. A single grease reservoir 196 or three or more grease reservoirs 196 may be arranged in the front-rear direction. The grease reservoirs 196 may be aligned laterally on the top or the bottom of the case body 190, or may be arranged either on the top or the bottom of the case body 190, or may be arranged on the right and left of the case body 190.

A felt piece 197, which serves as a lubricant-impregnated member and a second lubricant reservoir, is located above the pair of grease reservoirs 196 on the top of the case body 190. The felt piece 197 is prismatic. The felt piece 197 and the upper grease reservoirs 196 are arranged opposite to the downward edge of the blade attached to the blade clamp 156. The felt piece 197 may be located below the lower grease reservoirs 196 instead of or in addition to the felt piece 197 located above the upper grease reservoirs 196. The felt piece 197 may be eliminated.

The outer ring 184 is an elastic (rubber) ring member. The outer ring 184 is located outside the sealing portion 192. The outer ring 184 has a groove extending entirely along the circumference in the middle of its outer surface in the front-rear direction.

The inner ring 185 is an elastic (rubber) ring member. The inner ring 185 is in contact with the inner surface of the sealing portion 192. The inner ring 185 has an X-shaped cross section (X-ring) having recesses on its outer and inner surfaces. The inner ring 185 has grooves extending entirely along the radially-outer circumference and entirely along the radially-inner circumference.

The inner ring 185 is in contact with the outer surface of the slider base 158 on its inner surface excluding the inner groove. The inner groove on the inner ring 185 reduces an area in contact with the slider base 158 and reduces friction during reciprocation of the slider base 158, while increasing the tightness between the inner surface of the inner ring 185 and the slider base 158 excluding the inner groove. The inner ring 185 thus provides sufficient sealing with reduced friction.

The inner front ring 186 is an elastic (felt) ring member. The inner front ring 186 is in contact with the inner surface of the sealing portion 192. The inner front ring 186 is located in front of the inner ring 185. The inner front ring 186 has an inner surface in contact with the outer surface of the slider base 158.

The washer 188 is a ring with a lip. The washer 188 is fitted in the front end portion of the sealing portion 192 to serve as a lid. The washer 188 is located in front of the inner ring 185. The washer 188 is not in contact with the slider base 158.

At least any of the connecting rod 134, the bearing 154, the pin 136, the left guide roller 138, the right guide roller 140, the left guide 142, the right guide 144, and the slider guide 146 may be a component of the output unit (slider 6), rather than a component of the reciprocating conversion mechanism 5.

As the crank gear 130 rotates, the eccentric shaft 152 is displaced (revolves). The displacement component of the eccentric shaft 152 in the front-rear direction is then transmitted to the connecting rod 134.

The pin 136, the left guide roller 138, and the right guide roller 140 reciprocate in the front-rear direction with the connecting rod 134 (connecting rod type). The slider 6 also reciprocates in the front-rear direction with the pin 136.

During reciprocation, the left guide roller 138 rolls in the groove 160 while being guided by the left guide 142. The right guide roller 140 rolls in the groove 164 while being guided by the right guide 144. The connecting rod 134 is thus guided in the front-rear direction.

The left guide roller 138 rotates in the left guide 142, and the right guide roller 140 rotates in the right guide 144. Thus, the vertical displacement component caused by the revolution of the eccentric shaft 152 is not transmitted to the pin 136, the left guide roller 138, and the right guide roller 140.

The slider guide 146 supports the reciprocable slider base 158. The supporting slider guide 146 retains the slider 6 to extend in the front-rear direction.

The left guide roller 138, the right guide roller 140, the left guide 142, and the right guide 144 may be eliminated, and the connecting rod 134 and the slider 6 may be connected to each other simply with the pin 136. In some embodiments, the left guide roller 138, the left guide 142, and the pin 136 may be provided, and the right guide roller 140 and the right guide 144 may be eliminated. In some embodiments, the right guide roller 140, the right guide 144, and the pin 136 may be provided, and the left guide roller 138 and the left guide 142 may be eliminated.

The gear housing 20 is sealed with the bearing retainer 110 and the slider guide 146, and with an upper sealant 200 and a lower sealant 202 located between the bearing retainer 110 and the slider guide 146.

The upper sealant 200 is a linear elastic member. The upper sealant 200 has a substantially circular cross section. The upper sealant 200 is received in a groove on an upper thick part of the left gear housing 20a. The upper sealant 200 has its rear end bent downward and received from above in a groove on the upper end of the middle portion of the bearing retainer 110. The upper sealant 200 has its front end bent downward and received from above in an upper portion of an outer groove on the outer ring 184.

The lower sealant 202 is an elastic member similar to the upper sealant 200. The lower sealant 202 is received in a groove on a lower thick part of the left gear housing 20a. The lower sealant 202 has its rear end bent upward and received from below in a groove on the lower end of the middle portion of the bearing retainer 110. The lower sealant 202 has its front end bent upward and received from below in a lower portion of the outer groove on the outer ring 184.

The gear housing 20 sealed with the bearing 108, the slider guide 146, the upper sealant 200, and the lower sealant 202 contains a predetermined amount of grease. The predetermined amount refers to, for example, an amount to cover the inner wall of the gear housing 20 and the outer walls of the internal components of the gear housing 20.

The lubricating oil in the grease lubricates the components in the gear housing 20.

Parts of the outer curved surface of the oilless bearing 182 are exposed in the grease reservoirs 196. This allows grease to come in contact with the outer curved surface of the oilless bearing 182. The oilless bearing 182 is formed from a porous sintered material. This structure allows the lubricating oil in grease on the outer curved surface of the oilless bearing 182 to be impregnated through the oilless bearing 182 to its inner surface. This prevents oil film breakdown on the inner surface of the oilless bearing 182.

The felt piece 197 impregnated with grease is located adjacent to the upper grease reservoirs 196. Thus, the felt piece 197 serves as lids for the upper grease reservoirs 196 to prevent grease from leaking from the upper grease reservoirs 196.

The blade clamp 156 in the slider 6 includes a push pin 210, a push-pin compression spring 211, a guide sleeve 212, a holding pin 213, a holding-pin compression spring 214, an auxiliary pin 215, a cam sleeve 216, a stop ring 217, an auxiliary sleeve 218, and a torsion spring 219.

The slider base 158 has, in its front end, a slit 220, a first holding-pin hole 222, a first auxiliary-pin hole 223, and a step 224.

The slit 220 extends in the front-rear and vertical directions. The slit 220 has a width (distance in the lateral direction) slightly larger than the thickness of the blade. The slit 220 has, in the middle in the vertical direction, a larger space expanded rightward than the other portion.

The first holding-pin hole 222 is located on the right of the slit 220 and communicates with the slit 220. The first holding-pin hole 222 extends laterally. The first holding-pin hole 222 has a larger diameter in its right portion than in its left portion.

The first auxiliary-pin hole 223 is located on the left of the slit 220 and communicates with the slit 220. The first auxiliary-pin hole 223 extends laterally. The first auxiliary-pin hole 223 faces the first holding-pin hole 222. The first auxiliary-pin hole 223 receives, in the middle on its right inner surface, a rib protruding radially inward relative to the other portion.

The slider base 158 has a front end with a smaller outer diameter than its rear portion, and has the step 224 defined by the different diameters.

The slit 220 receives the push pin 210 in its middle portion in the vertical direction. The push pin 210 extends in the front-rear direction. The push pin 210 has a D-shaped cross section. The push pin 210 has, on its right front, a recess receding leftward from its rear portion. The push pin 210 has its portion rearward from the recess received in the expanded space in the slit 220.

The slit 220 receives the push-pin compression spring 211 in its middle portion in the vertical direction. The push-pin compression spring 211 has its right portion received in the larger space in the slit 220. The push-pin compression spring 211 is an elastic member, or more specifically, a coil spring. The push-pin compression spring 211 is located behind the push pin 210. The push-pin compression spring 211 has its rear end received on the rear bottom of the slit 220. The push-pin compression spring 211 has its front end in contact with the push pin 210. The push-pin compression spring 211 is located between the push pin 210 and the slider base 158. The push-pin compression spring 211 urges the push pin 210 frontward.

The guide sleeve 212 is cylindrical. The guide sleeve 212 is located outside the front end of the slider base 158. The guide sleeve 212 has an axis extending in the front-rear direction.

The guide sleeve 212 has a second holding-pin hole 226 and a second auxiliary-pin hole 228 in its middle portion.

The second holding-pin hole 226 is located on the right of the guide sleeve 212. The second holding-pin hole 226 extends laterally. The second holding-pin hole 226 is aligned with the first holding-pin hole 222. The second holding-pin hole 226 has a larger diameter than the right portion of the first holding-pin hole 222.

The second auxiliary-pin hole 228 is located on the left of the guide sleeve 212. The second auxiliary-pin hole 228 extends laterally. The second auxiliary-pin hole 228 faces the second holding-pin hole 226. The second auxiliary-pin hole 228 has substantially the same diameter as a portion of the first auxiliary-pin hole 223 leftward from the rib.

The holding pin 213 is received in the first holding-pin hole 222 and the second holding-pin hole 226. The holding pin 213 is a solid cylinder and extends laterally. The holding pin 213 has its middle portion with substantially the same diameter as the left portion of the first holding-pin hole 222. The holding pin 213 has a left end with a smaller diameter than the other portion. The holding pin 213 has a step on the left end (a stepped pin). The holding pin 213 has the left end tapered leftward. The holding pin 213 has its right end with a larger diameter than the other portion. The holding pin 213 thus has a head with a larger diameter than the other portion in its right end. The holding pin 213 has a curved right surface expanding rightward.

The holding-pin compression spring 214 is an elastic member, or more specifically, a coil spring. The holding-pin compression spring 214 has its left end in contact with the larger-diameter portion of the first holding-pin hole 222. The holding-pin compression spring 214 has its right end in contact with the left surface of the head of the holding pin 213. The holding-pin compression spring 214 is located between the holding pin 213 and the slider base 158. The holding-pin compression spring 214 urges the holding pin 213 rightward.

The auxiliary pin 215 is received in the first auxiliary-pin hole 223 and the second auxiliary-pin hole 228. The auxiliary pin 215 is a solid cylinder and extends laterally. The auxiliary pin 215 has its right end to be in contact with the rib on the first auxiliary-pin hole 223. The auxiliary pin 215 has substantially the same diameter as the left portion of the first auxiliary-pin hole 223 and the second auxiliary-pin hole 228. The auxiliary pin 215 connects the slider base 158 with the guide sleeve 212.

The cam sleeve 216 is cylindrical. The cam sleeve 216 has its axis extending in the front-rear direction. The cam sleeve 216 is located outside the guide sleeve 212, the holding pin 213, and the auxiliary pin 215. The cam sleeve 216 is rotatable about the slider base 158 and the guide sleeve 212. The cam sleeve 216 has an extension in its top to right portions. The extension extends radially outward relative to the other portion of the cam sleeve 216. The extension has a cam surface 216C on its inner surface. The cam surface 216C has a radial dimension gradually increasing counterclockwise from the top as viewed from the front. The cam surface 216C is in contact with the curved surface of the head of the holding pin 213. When the blade clamp 156 receives no blade, the head of the holding pin 213 is in contact with a part of a cam surface 216C nearer the greatest radial dimension of the cam surface 216C. When the blade clamp 156 receives a blade, the head of the holding pin 213 is in contact with a part of a cam surface 216C nearer the least radial dimension of the cam surface 216C. The cam sleeve 216 includes multiple (two) projections 234 protruding radially outward. The projections 234 are diagonal to each other. The cam sleeve 216 further has, on its inner surface of the opening in the rear end, multiple recesses receding radially outward from other inner surfaces. The recesses are aligned circumferentially.

The stop ring 217 is a ring member. The stop ring 217 is fixed on the outer surface of the guide sleeve 212. The stop ring 217 is located in front of the cam sleeve 216 to prevent the cam sleeve 216 from moving forward.

The auxiliary sleeve 218 is cylindrical. The auxiliary sleeve 218 has its axis extending in the front-rear direction. The auxiliary sleeve 218 is located outside the slider base 158 and is rotatable about the slider base 158. The auxiliary sleeve 218 is located in front of the step 224. The step 224 prevents the auxiliary sleeve 218 from moving rearward. The auxiliary sleeve 218 includes, on its outer surface surrounding the opening in the rear end, multiple protrusions protruding radially outward relative to the other portion of the outer surface. The rear end of the auxiliary sleeve 218 is received in the opening in the rear end of the cam sleeve 216. The protrusions on the auxiliary sleeve 218 are received in the corresponding recesses on the cam sleeve 216. The auxiliary sleeve 218 rotates together with the cam sleeve 216.

The torsion spring 219 is an elastic ring member. The torsion spring 219 has its rear end extending vertically in the middle in the lateral direction to be received in the slit 220. The rear end of the torsion spring 219 is located between the rear bottom of the slit 220 and the rear end of the push-pin compression spring 211. The rear end of the torsion spring 219 is fixed to the slider base 158. The torsion spring 219 excluding its rear end surrounds the front end of the slider base 158 and is located on the rear of the auxiliary sleeve 218. The torsion spring 219 has its front end received in a hole in the front-rear direction in the auxiliary sleeve 218 and fixed to the auxiliary sleeve 218. The torsion spring 219 urges the auxiliary sleeve 218 circumferentially counterclockwise as viewed from the front.

The blade has a holding hole in its rear end. The holding hole has a slightly larger diameter than the left end of the holding pin 213. The blade has a cutout in its corner opposite to the rear end of the edge. The blade has a protruding tab on its rear end protruding rearward on the same side as the edge. The blade has a shoulder on an upper rear of the protruding tab. The blade further has a protrusion on its rear end opposite to the edge. The protrusion protrudes upward relative to the other portion of the upper side of the blade.

When the rear end of the blade is not received in the slit 220, the front end of the push pin 210 is located on the left of the holding pin 213. The holding pin 213 retracts rightward.

When the rear end of the blade is received in the slit 220, the blade pushes, with the shoulder, the push pin 210 rearward against the urging force from the push-pin compression spring 211.

When the rear end of the blade moves rearward and the holding hole in the blade is located on the left of the holding pin 213, the cam surface 216C of the cam sleeve 216 pushes the holding pin 213 leftward against the urging force from the holding-pin compression spring 214. More specifically, the cam sleeve 216 is urged by the torsion spring 219 through the auxiliary sleeve 218. The torsion spring 219 applies an urging force counterclockwise as viewed from the front. When the holding hole in the blade is located on the left of the holding pin 213, the holding pin 213 is movable leftward. The cam sleeve 216 then rotates counterclockwise as viewed from the front. The curved surface of the holding pin 213 comes in contact with an inwardly extending portion (a portion with a less radial dimension) of the cam surface 216C. The cam surface 216C pushes the holding pin 213 leftward.

The holding pin 213 pushed leftward enters, with left portion from the step, the holding hole in the blade to hold (clamp) the blade.

The blade is thus automatically held when simply inserted in the slit 220 (quick attachment).

The protrusion on the blade held by the blade clamp 156 comes in contact with the front end face of the guide sleeve 212.

The auxiliary pin 215, which is different from the holding pin 213, fixes the guide sleeve 212 to prevent the guide sleeve 212 from moving in the front-rear direction and from rotating relative to the slider base 158. The holding pin 213 is received in the first holding-pin hole 222 having the right portion with the larger diameter.

The release mechanism 7 includes a release drum 240 and a tension spring 242.

The release drum 240 is cylindrical and surrounds the cam sleeve 216. The release drum 240 is adjacent to the blade clamp 156. The release drum 240 is an operation drum operable by the user to detach (release) the blade from the blade clamp 156.

The release drum 240 includes multiple (two) inwardly-raised portions 248 and an operation tab 250.

The inwardly-raised portions 248 are located on the inner surface of the release drum 240 and raised radially inward relative to the other portion of the inner surface. The inwardly-raised portions 248 face each other.

The operation tab 250 is located on the right of the release drum 240. The operation tab 250 protrudes radially outward relative to the other portion of the outer surface. The operation tab 250 is trapezoidal in a cross section. The operation tab 250 has its distal end thinner than its basal end. The operation tab 250 extends from the upper left to the lower right as indicated by the solid line in the figure, and has a width in the front-rear direction. The operation tab 250 is integral with the other portion of the release drum 240 (the cylindrical body of the release drum). The operation tab 250 protrudes rightward through the first operation tab hole 67 in the gear housing 20 and the second operation tab hole 79 in the cover 22.

The tension spring 242 is a coil spring. The tension spring 242 is located circumferentially outside the release drum 240 and extends circumferentially along the release drum 240. The tension spring 242 is located adjacent to (on the right of) the release drum 240 that is held by the right gear housing 20b.

The tension spring 242 has a hook-shaped first end to be engaged with the release drum 240. The tension spring 242 has a hook-shaped second end to be fixed to the left gear housing 20a.

When the tension spring 242 is slightly expanded from its equilibrium length, the inwardly-raised portions 248 on the release drum 240 are not in contact with the corresponding projections 234 on the cam sleeve 216 in a clamping state. In this state, the operation tab 250 on the release drum 240 is in contact with the lower ends of the first operation tab hole 67 and the second operation tab hole 79. The tension spring 242 may be in other states, such as the state having the equilibrium length.

The user can operate the operation tab 250 at the lower position upward to rotate the release drum 240 about the axis against the urging force from the tension spring 242. This rotation of the release drum 240 causes the inwardly-raised portions 248 to come in contact with the corresponding projections 234 on the cam sleeve 216 and rotate the cam sleeve 216 clockwise as viewed from the front. The head of the holding pin 213 is thus received in a portion of the cam surface 216C having a greater radial dimension. The holding pin 213 retracts rightward under the urging force from the holding-pin compression spring 214 and disengages from the holding hole in the blade (unclamped). The push pin 210 then moves forward under the urging force from the push-pin compression spring 211 to push the unclamped blade forward and moves to the left of the holding pin 213. The push pin 210 smoothly moves to the left of the holding pin 213 with the recess on the front end of the push pin 210.

The release drum 240 in the release mechanism 7 cooperates with the internal blade clamp 156, causing the blade to be released from the blade clamp 156 in response to the upward operation of the operation tab 250.

The push pin 210 on the left of the holding pin 213 prevents the holding pin 213 from moving leftward. The holding pin 213 thus prevents the cam sleeve 216 from rotating counterclockwise as viewed from the front against the urging force from the torsion spring 219 applied counterclockwise as viewed from the front.

The operation drum may be used to attach the blade instead of or in addition to releasing the blade.

The blade attached to the blade clamp 156 extends through the guide shoe 12.

The guide shoe 12 is located in front of and under the slider 6.

The guide shoe 12 includes a shoe plate 290, a shoe supporter cover 292, a shoe supporter 296, and multiple (two) pins 297.

The shoe plate 290 can be in contact with a workpiece.

The shoe supporter cover 292 is fixed to the gear housing 20. The body housing 2 does not include the shoe supporter cover 292. However, the body housing 2 may include the shoe supporter cover 292.

The shoe supporter 296 is located inside the shoe supporter cover 292 in a manner slidable in the front-rear direction. The shoe supporter cover 292 does not reach the front end of the cover 22. The shoe supporter 296 is thus in contact with a contact 22T on a lower inner surface of the front end of the cover 22. The contact 22T is raised radially inward (upward) relative to the other portion of the inner front surface of the cover 22.

The pins 297 are located on the right and left of the front end of the shoe supporter 296. The pins 297 support the shoe plate 290 in a swingable manner about the axis in the lateral direction.

The shoe supporter 296 and the shoe supporter cover 292 each have a U-shaped cross section. The shoe supporter 296 and the shoe supporter cover 292 are located between the outer surface of the lower front portion of the gear housing 20 and the inner surface of the lower front portion of the cover 22.

A shoe lever 299 is located outside the shoe supporter cover 292. The shoe lever 299 includes a shoe supporter-fixing shaft (not shown) extending laterally above the shoe supporter cover 292 and the shoe supporter 296. The shoe lever 299 is rotatable about the shoe supporter-fixing shaft, and operable to be open and closed with respect to the shoe supporter cover 292.

When the shoe lever 299 is closed (extends in the front-rear direction in the figures), the shoe supporter-fixing shaft fastens and fixes the shoe supporter 296. When the shoe lever 299 is open (extends in the vertical direction), the shoe supporter-fixing shaft releases the shoe supporter 296. This allows the shoe supporter 296 and the shoe plate 290 to slide in the front-rear direction to adjust their positions.

Although the reciprocating saw 1 is directed downward with its font facing downward with the shoe lever 299 being open, the contact 22T on the cover 22 comes in contact with the shoe supporter 296. This prevents the shoe supporter 296 and the shoe plate 290 from falling freely under their weight. More specifically, the cover 22 is an elastic member, and the contact 22T thus has a high coefficient of friction with the shoe supporter 296. The friction between the shoe supporter 296 and the contact 22T prevents the shoe supporter 296 and the shoe plate 290 from falling freely.

As shown in FIGS. 6 and 7, the counterweight mechanism 8 is combined with the reciprocating conversion mechanism 5.

The counterweight mechanism 8 includes a metal balancer 300.

The balancer 300 has the shape of a part of a round plate extending in the front-rear and vertical directions.

The balancer 300 includes a sector portion 302 and an arm portion 304. The sector portion 302 has a central angle of about 100 degrees as viewed from the left. The arm portion 304 extends in the radially opposite direction from the central angle portion of the sector portion 302. The sector portion 302 serves as a weight portion having most of the weight of the balancer 300. The arm portion 304 has a hole 306 in its end opposite to the sector portion 302. The hole 306 extends laterally.

The balancer 300 receives the right end of the eccentric shaft 152 press-fitted in the hole 306 and is connected to the eccentric shaft 152, which is integral with the crank gear 130 in the reciprocating conversion mechanism 5. The balancer 300 is cantilevered by the eccentric shaft 152. The balancer 300 is located on the right of the connecting rod 134.

The central angle portion of the balancer 300 and the central portion of the crank gear 130 overlap each other as viewed from the left to the right, or specifically in a side view. The central angle portion of the balancer 300 has a hole 307, which extends laterally. The hole 307 can receive a tool (e.g., a driver) for attaching the support shaft 132.

The balancer 300 is integral with the crank gear 130 (eccentric shaft 152). The balancer 300 rotates about the arm portion 304 as the crank gear 130 rotates (the eccentric shaft 152 revolves). When the slider 6 is located at a retracted position (the position shown in the figures), the eccentric shaft 152 is located at the rear, and the sector portion 302 of the balancer 300 is at the front. When the slider 6 is located at an advanced position, the eccentric shaft 152 is located at the front, and the sector portion 302 of the balancer 300 is at the rear. The weight and the center of gravity of the sector portion 302 of the balancer 300 are set to minimize vibrations of the slider 6, the blade, and the connecting rod 134. The balancer 300 (sector portion 302) operates in the direction opposite to the reciprocation of the slider 6 and other components, and thus serves as a counterweight.

An example operation of the reciprocating saw 1 will now be described.

The user attaches a blade to the blade clamp 156 in the stopped slider 6 with the edge facing downward. The user adjusts the length of the guide shoe 12 as appropriate, and places the shoe plate 290 in the guide shoe 12 to have the front surface in contact with a workpiece. The user mounts the charged battery 61 on the battery mount rail 19e. The user presses the speed switch button 36 on its right or left to select a high speed mode or a low speed mode.

The user holds the first grip 30 (and the second grip 80) and pulls the trigger 33 by a predetermined amount. This turns on the main switch body 34 and powers the motor 3 to rotate the rotational shaft 100. The motor 3 operates on DC power rectified through the controller 40. The lamp 68 is turned on in response to the trigger 33 pulled by an amount exceeding a specified amount. The specified amount is less than the predetermined amount set for the motor 3 to be powered.

A microcomputer in the controller 40 obtains information for determining the rotational state of the rotor 82 from the sensor board 92. The microcomputer in the controller 40 also controls the on-off state of each switching element in accordance with the determined rotational state, and sequentially applies a current through the coils 90 in the stator 81 to rotate the rotor 82. The controller 40 for the motor 3, which is a brushless motor, may typically generate heat when driving the microcomputer. The heat accumulating on the controller 40 may affect the operation of the controller 40.

The rotational shaft 100 rotates at a rotational speed in accordance with a signal (the pulling amount of the trigger 33) from the main switch body 34 that has been turned on. The rotational shaft 100 rotates at a higher rotational speed in correspondence with a larger pulling amount of the trigger 33.

As the rotational shaft 100 rotates, the crank gear 130 rotates, and the slider 6 reciprocates with the connecting rod 134. The sector portion 302 of the balancer 300 moves in the direction opposite to the slider 6 in the front-rear direction, and the slider 6 reciprocates with reduced vibrations.

The slider 6 is guided by the left guide roller 138, the right guide roller 140, and the slider guide 146 while being prevented from facing in a direction other than the front-rear direction. More specifically, the slider 6 is guided while being prevented from moving (including changing the attitude) in a direction other than the reciprocating direction.

When the slider 6 reciprocates in the front-rear direction to the foremost position, the slider guide 146 comes in contact with the rear of the slider base 158 and supports the load of the rear of the slider 6. When the slider 6 is at the rearmost position, the slider guide 146 comes in contact with the front of the slider base 158 and supports the load of the front of the slider 6.

As the user lowers the blade toward a workpiece with the slider 6 or the blade operating, the edge on the reciprocating blade comes in contact with the workpiece and cuts the workpiece.

The rotation of the rotational shaft 100 rotates the fan 4 to force the air around the fan 4 radially outward. Air is drawn through the inlets 31 and flows through the motor housing 18 to the fan 4, producing an air flow (blow) passing through the body air channel 122 and the lower air channel 50. More specifically, this produces an inlet blow WI flowing from the inlets 31 to the fan 4. This also produces a first outlet blow WM flowing from the fan 4 to the body air channels 122 (body outlets 76). This also produces a second outlet blow WS flowing from the fan 4 to the lower air channel 50 (lower outlets 51).

An outlet blow WU above the body flows from the fan 4 through the upper clearance 120U, between an upper portion of the motor housing 18 and an upper portion of the cover 22, and into a clearance facing the outer surfaces of the motor housing 18 and the cover 22. An outlet blow WD under the body flows from the fan 4 through the lower clearance 120D, between a lower portion of the motor housing 18 and a lower portion of the cover 22, and into a clearance facing the outer surfaces of the motor housing 18 and the cover 22. The outlet blow WU has a lower airflow rate than the first outlet blow WM due to the size of the clearances 120U and 120D and the space between the motor housing 18 and the cover 22. For example, the outlet blow WU has an airflow rate of about 5% of the airflow rate of the first outlet blow WM. The outlet blow WD has an airflow rate similar to or lower than that of the outlet blow WU.

The inlet blow WI, the first outlet blow WM, the second outlet blow WS, the outlet blow WU, and the outlet blow WD cool the components inside the body housing 2.

In particular, the inlet blow WI cools the motor 3. The inlet blow WI cools the stator 81 and the rotor 82 by passing between the stator 81 and the rotor 82. The inlet blow WI also cools the motor case 3a and the stator 81 by passing between the motor case 3a and the stator 81.

The first outlet blow WM passes outside the gear housing 20, which accommodates the reciprocating conversion mechanism 5 and the counterweight mechanism 8. The first outlet blow WM thus cools the reciprocating conversion mechanism 5 and the counterweight mechanism 8. The reciprocating conversion mechanism 5 (in particular, crank gear 130) and the counterweight mechanism 8 operate at a higher speed than other components and generate more heat. These mechanisms are sufficiently cooled by the first outlet blow WM. The first outlet blow WM is discharged through the body outlets 76 in the middle of the body 69 of the reciprocating saw 1. The reciprocating saw 1 is thus less likely to scatter dust from a workpiece during cutting than a reciprocating saw discharging an outlet blow in front of the housing, as described in Patent Literature 1.

The second outlet blow WS cools the controller 40. The second outlet blow WS passes along the controller case 44, which covers the control circuit board 42. The second outlet blow WS thus sufficiently cools the control circuit board 42 while preventing dust from entering the control circuit board 42. The starting end of the lower air channel 50 (between the first air channel rib 18U and the motor housing 18) is located in the radial direction of the fan 4. The second outlet blow WS is thus smoothly drawn into the lower air channel 50. The second outlet blow WS smoothly flows through the lower air channel 50.

In other words, air drawn through the inlets 31 cools the motor 3 and is then divided into the first outlet blow WM and the second outlet blow WS. The first outlet blow WM cools the reciprocating conversion mechanism 5 and is discharged through the body outlets 76, whereas the second outlet blow WS cools the controller 40 and is discharged through the lower outlets 51.

When the user turns off the main switch body 34 by operating the trigger 33, the rotational shaft 100 of the motor 3 stops, and each component stops reciprocating to stop the air inflow and outflow. The lamp 68 turns off after a predetermined time period.

The reciprocating saw 1 according to the present embodiment includes the body housing 2, the motor 3 held on the body housing 2 and including the rotational shaft 100, the slider 6 supported on the body housing 2 in a reciprocable manner, the reciprocating conversion mechanism 5 between the motor 3 and the slider 6 in the body housing 2 and transmitting rotational motion of the rotational shaft 100 to the slider 6, the controller 40 held on the body housing 2 and controlling the motor 3, and the fan 4 held on the body housing 2 and mounted on the rotational shaft 100. The body housing 2 includes the first grip 30, the inlets 31 facing the front surface of the first grip 30, the body outlets 76, and the lower outlets 51. Air drawn through the inlets 31 cools the motor 3 and is then divided into the first outlet blow WM and the second outlet blow WS. The first outlet blow WM cools the reciprocating conversion mechanism 5 and is discharged through the body outlets 76, whereas the second outlet blow WS cools the controller 40 and is discharged through the lower outlets 51.

This structure effectively cools the motor 3 as a brushless motor, the reciprocating conversion mechanism 5, and the controller 40.

The controller 40 is located below the fan 4. The controller 40 is received in an unused space in front of the first grip 30 and below the motor 3. The second outlet blow WS for cooling the controller 40 is discharged in front of and downward from the first grip 30, being less likely to hit the user's hand.

The slider 6 is located in front of the reciprocating conversion mechanism 5. The second grip 80 is located in the front portion of the body housing 2. The body outlets 76 are located in front of the fan 4 and behind the second grip 80. The reciprocating saw 1 according to the present embodiment thus has a lower likelihood that water entering the body outlets 76 reaches the fan 4 than a reciprocating saw with outlets aligned in the radial direction of the fan 4. This improves the waterproof property of the reciprocating saw 1.

The body outlets 76 are adjacent to a side surface of a front portion of the reciprocating conversion mechanism 5. This structure sufficiently cools the reciprocating conversion mechanism 5. With the outlets apart from the workpiece and the blade, the first outlet blow WM is less likely to scatter dust than an outlet blow discharged through the front end of the slider 6.

The cover 22 includes the cover bulges 70 protruding outward relative to the other portion. Each cover bulge 70 has the body outlets 76. This smoothens the flow of the first outlet blow WM, which is discharged efficiently.

The first grip 30 extends vertically. The upper joint 30U connects the upper end of the first grip 30 to a portion of the body housing 2 located outside the motor 3 and the controller 40 (a portion of the motor housing 18 holding the motor 3 and the controller 40). The lower joint 30D connects the lower end of the first grip 30 to a portion of the body housing 2 located outside the motor 3 and the controller 40 (a portion of the motor housing 18 holding the motor 3 and the controller 40). The lower outlets 51 are located in front of the lower joint 30D. The second outlet blow WS cooling the controller 40 is thus discharged in front of and downward from the first grip 30, being less likely to hit the user's hand.

The battery mount rails 19e are located to receive the battery 61 for powering the motor 3. The lower outlets 51 are located below and in front of the battery mount rails 19e. The battery 61 and the lower outlets 51 are located in a smaller space. This structure reliably cools the motor 3, the reciprocating conversion mechanism 5, and the controller 40 in the reciprocating saw 1 driven with the battery 61.

The first wall surface 44W of the controller 40 and the second wall surface 18W of the body housing 2 define the lower air channel 50. The second outlet blow WS passes through the lower air channel 50. The second outlet blow WS thus reliably cools the controller 40. The second outlet blow WS reliably passes through the lower air channel 50 without through any unintended air channels.

The controller 40 includes the controller case 44. The controller 40 is inclined upward toward the front. The first wall surface 44W is the bottom of the controller case 44. The controller 40 is thus reliably cooled. The first wall surface 44W, which is the bottom of the controller case 44, efficiently defines the lower air channel 50.

The body housing 2 includes the cover 22. The cover 22 has the body outlets 76. The cover 22 thus efficiently defines the body air channels 122.

The reciprocating saw 1 includes, as its power transmission mechanism, the reciprocating conversion mechanism 5 for converting rotational motion of the rotational shaft 100 into reciprocating motion and transmitting the motion to the slider 6. The slider 6 receives a blade having an edge on one side. This structure efficiently cools the motor 3, the reciprocating conversion mechanism 5, and the controller 40 in the reciprocating saw 1 including the slider 6 reciprocable with the reciprocating conversion mechanism 5.

The slider 6 extends in the front-rear direction. The reciprocating conversion mechanism 5 includes the crank gear 130 and the connecting rod 134. The crank gear 130 includes the eccentric shaft 152 in the lateral direction. The connecting rod 134 is connected to the eccentric shaft 152 and the slider 6. The crank gear 130 is rotated by the motor 3. This structure thus efficiently cools the motor 3, the reciprocating conversion mechanism 5, and the controller 40 in the reciprocating saw 1 including the crank gear 130 extending in the front-rear and vertical directions, which is referred to as a vertical crank reciprocating saw.

The controller 40 is located obliquely in front of the battery mount rails 19e. The controller 40 thus uses a smaller space in the front-rear and vertical directions. The reciprocating saw 1 is more compact in its battery mounts and around the mounts than a reciprocating saw having the controller 40 above the battery mount rails 19e. This structure easily accommodates the rubber buffer 58.

The embodiments and the modifications are not limited to those described above. For example, the embodiments and the modifications may be further modified appropriately as described below.

The body outlets 76 may be located in a portion of the cover 22 in front of the reciprocating conversion mechanism 5. The body outlets 76 may be located in the gear housing 20. The lower outlets 51 may be located outside the controller 40.

The cover 22 may be halved into right and left covers.

The counterweight mechanism 8 may be modified variously. For example, the counterweight mechanism 8 may include the balancers 300 on both the right and left of the gear, or may be eliminated.

Some of the components may be eliminated, or the number of components, their materials, shapes, types, and arrangement may be modified variously. For example, the arrangement, the number, and the connection of the lead wire may be changed. The ball bearings may be replaced with needle bearings, or the size, the arrangement, and the number of at least the inlets 31, the body outlets 76, or the lower outlets 51 may be changed.

The blade may have an edge other than a sawtooth edge.

In place of the battery 61, a cord may be used to supply power. The cord may be connected to utility power.

The embodiments and their modifications are applicable to reciprocating cutting tools other than the reciprocating saw 1 (e.g., a jigsaw) and reciprocating tools and power tools other than reciprocating cutting tools.

REFERENCE SIGNS LIST 1 reciprocating saw (reciprocating cutting tool, power tool)
2 body housing
3 motor (brushless motor)
4 fan
5 reciprocating conversion mechanism (power transmission mechanism)
6 slider (output unit)
18 motor housing
18W second wall surface
19e battery mount rail (battery mount)
20 gear housing
22 cover
30 first grip
30D lower joint
30U upper joint
31 inlet
40 controller
44 controller case
44W first wall surface
50 lower air channel (outlet channel)
51 lower outlet (second outlet)
61 battery
70 cover bulge (bulge)
76 body outlet (first outlet)
80 second grip
100 rotational shaft
130 crank gear
134 connecting rod 152 eccentric shaft
WI inlet blow
WM first outlet blow
WS second outlet blow

What is claimed is:

1. A power tool, comprising:
   a body housing including
      a first grip,
      an inlet facing a front surface of the first grip,
      a first outlet, and
      a second outlet;
   a brushless motor held on the body housing and including a rotational shaft;
   an output unit supported on the body housing in a reciprocable manner;
   a power transmission mechanism located between the brushless motor and the output unit in the body housing to transmit rotational motion of the rotational shaft to the output unit;
   a controller held on the body housing to control the brushless motor;
   a fan held on the body housing and mounted on the rotational shaft; and
   a second grip located in a front portion of the body housing, wherein
      the body housing is configured to divide air drawn through the inlet and having cooled the brushless motor into a first outlet blow for cooling the power transmission mechanism and being discharged through the first outlet and a second outlet blow for cooling the controller and being discharged through the second outlet,
      the output unit is located in front of the power transmission mechanism, and
      the first outlet is located in front of the fan and behind the second grip.

2. The power tool according to claim 1, wherein the controller is located below the fan.

3. The power tool according to claim 2, wherein the first outlet is adjacent to a side surface of a front portion of the power transmission mechanism.

4. The power tool according to claim 2, wherein the body housing includes a bulge protruding outward, and the bulge has the first outlet.

5. The power tool according to claim 2, wherein the first grip extends vertically,
   the power tool further includes an upper joint connecting an upper end of the first grip with the body housing outside the brushless motor and the controller, and
   a lower joint connecting a lower end of the first grip with the body housing outside the brushless motor and the controller, and
   the second outlet is located in front of the lower joint.

6. The power tool according to claim 1, wherein the first outlet is adjacent to a side surface of a front portion of the power transmission mechanism.

7. The power tool according to claim 6, wherein the body housing includes a bulge protruding outward, and the bulge has the first outlet.

8. The power tool according to claim 1, wherein the body housing includes a bulge protruding outward, and the bulge has the first outlet.

9. The power tool according to claim 1, further comprising:
   a battery mount on which a battery is mountable to power the brushless motor,
   wherein the second outlet is located below and in front of the battery mount.

10. The power tool according to claim 1, wherein the body housing includes a cover, and the cover has the first outlet.

11. The power tool according to claim 1, wherein the power transmission mechanism is a reciprocating conversion mechanism configured to convert rotational motion of the rotational shaft into reciprocating motion and transmit the reciprocating motion to the output unit, and
    the output unit receives a blade having an edge.

12. A power tool, comprising:
    a body housing including
       a first grip,
       an inlet facing a front surface of the first grip,
       a first outlet, and
       a second outlet;
    a brushless motor held on the body housing and including a rotational shaft;
    an output unit supported on the body housing in a reciprocable manner;
    a power transmission mechanism located between the brushless motor and the output unit in the body housing to transmit rotational motion of the rotational shaft to the output unit;
    a controller held on the body housing to control the brushless motor; and
    a fan held on the body housing and mounted on the rotational shaft, wherein
       the body housing is configured to divide air drawn through the inlet and having cooled the brushless motor into a first outlet blow for cooling the power transmission mechanism and being discharged through the first outlet and a second outlet blow for cooling the controller and being discharged through the second outlet,
       the first grip extends vertically,
       the power tool further includes an upper joint connecting an upper end of the first grip with the body housing outside the brushless motor and the controller, and
       a lower joint connecting a lower end of the first grip with the body housing outside the brushless motor and the controller, and
    the second outlet is located in front of the lower joint.

13. The power tool according to claim 12, wherein the controller is located below the fan.

14. The power tool according to claim 12, further comprising:
    a battery mount on which a battery is mountable to power the brushless motor,
    wherein the second outlet is located below and in front of the battery mount.

15. The power tool according to claim 12, further comprising:
    an outlet channel defined by a first wall surface of the controller and a second wall surface of the body housing, the outlet channel allowing the second outlet blow to pass through.

16. The power tool according to claim 15, wherein
the controller includes a controller case,
the controller is inclined upward toward the front, and
the first wall surface is a bottom of the controller case.

17. A power tool, comprising:
a body housing including
  a first grip,
  an inlet facing a front surface of the first grip,
  a first outlet, and
  a second outlet;
a brushless motor held on the body housing and including a rotational shaft;
an output unit supported on the body housing in a reciprocable manner;
a power transmission mechanism located between the brushless motor and the output unit in the body housing to transmit rotational motion of the rotational shaft to the output unit;
a controller held on the body housing to control the brushless motor;
a fan held on the body housing and mounted on the rotational shaft; and
an outlet channel defined by a first wall surface of the controller and a second wall surface of the body housing, the outlet channel allowing the second outlet blow to pass through,
wherein the body housing is configured to divide air drawn through the inlet and having cooled the brushless motor into a first outlet blow for cooling the power transmission mechanism and being discharged through the first outlet and a second outlet blow for cooling the controller and being discharged through the second outlet.

18. The power tool according to claim 17, wherein
the controller includes a controller case,
the controller is inclined upward toward the front, and
the first wall surface is a bottom of the controller case.

19. A power tool, comprising:
a body housing including
  a first grip,
  an inlet facing a front surface of the first grip,
  a first outlet, and
  a second outlet;
a brushless motor held on the body housing and including a rotational shaft;
an output unit supported on the body housing in a reciprocable manner;
a power transmission mechanism located between the brushless motor and the output unit in the body housing to transmit rotational motion of the rotational shaft to the output unit;
a controller held on the body housing to control the brushless motor; and
a fan held on the body housing and mounted on the rotational shaft, wherein
  the body housing is configured to divide air drawn through the inlet and having cooled the brushless motor into a first outlet blow for cooling the power transmission mechanism and being discharged through the first outlet and a second outlet blow for cooling the controller and being discharged through the second outlet,
  the power transmission mechanism is a reciprocating conversion mechanism configured to convert rotational motion of the rotational shaft into reciprocating motion and transmit the reciprocating motion to the output unit,
  the output unit receives a blade having an edge,
  the output unit extends in a front-rear direction,
  the reciprocating conversion mechanism includes
    a crank gear including an eccentric shaft extending laterally, and
    a connecting rod connected to the eccentric shaft and the output unit, and
  the crank gear is rotatable by the brushless motor.

\* \* \* \* \*